United States Patent
Barbarito et al.

(10) Patent No.: US 9,875,537 B2
(45) Date of Patent: Jan. 23, 2018

(54) COMPUTER IMPLEMENTED METHODS FOR IDENTIFYING CHANNELS IN A 3D VOLUME AND COMPUTER PROGRAM PRODUCT IMPLEMENTING THE METHODS

(71) Applicants: UNIVERSITAT POMPEU FABRA, Barcelona (ES); HOSPITAL CLÍNIC DE BARCELONA, Barcelona (ES)

(72) Inventors: Valeria Barbarito, Rome (IT); Luigi Carotenuto, Rome (IT); Luis Serra Del Molino, Barcelona (ES); Alejandro Frangi, Barcelona (ES); Josep Brugada, Baryoles (ES); Antonio Berruezo, Barcelona (ES)

(73) Assignees: UNIVERSITAT POMPEU FABRA, Barcelona (ES); UNIVERSITAT DE BARCELONA, Barcelona (ES); HOSPITAL CLINIC DE BARCELONA, Barcelona (ES)

( * ) Notice: Subject to any disclaimer, the term of this patent is extended or adjusted under 35 U.S.C. 154(b) by 180 days.

(21) Appl. No.: 14/760,479

(22) PCT Filed: Jan. 13, 2014

(86) PCT No.: PCT/IB2014/000023
§ 371 (c)(1),
(2) Date: Jul. 13, 2015

(87) PCT Pub. No.: WO2014/111787
PCT Pub. Date: Jul. 24, 2014

(65) Prior Publication Data
US 2015/0356742 A1    Dec. 10, 2015

(30) Foreign Application Priority Data
Jan. 14, 2013   (EP) .................................. 13000178

(51) Int. Cl.
*G06K 9/00*     (2006.01)
*G06T 7/00*     (2017.01)
(Continued)

(52) U.S. Cl.
CPC .............. *G06T 7/0012* (2013.01); *G06T 7/11* (2017.01); *G06T 7/187* (2017.01); *G06T 2207/10088* (2013.01)

(58) Field of Classification Search
None
See application file for complete search history.

(56) References Cited

U.S. PATENT DOCUMENTS

| 2011/0190834 A1* | 8/2011 | Goldberger | ............ A61N 1/362 607/5 |
| 2011/0224962 A1* | 9/2011 | Goldberger | ......... G06F 19/3437 703/11 |

(Continued)

FOREIGN PATENT DOCUMENTS

| WO | WO 2010/023618 A1 | 3/2010 |
| WO | WO 2014/111787 A4 | 7/2014 |

*Primary Examiner* — Iman K Kholdebarin
(74) *Attorney, Agent, or Firm* — Robert J. Hess; Hess Patent Law Firm

(57) ABSTRACT

The methods comprise:
a) obtaining a 3D volume of the object containing two different sub-volumes identified as: well-defined zone (S) and not-well-defined zone (BZ) sub-volumes;
b) generating well-defined zone (S) and not-well-defined zone (BZ) patches from the two sub-volumes;
c) automatically identifying the possible channels by means of automatically obtaining candidate channels regions (CCR), dilating the perimeters of the well-defined zone (S) patches.

The method includes embodiments for a layered approach, an EAM polygonal mesh approach and a volume approach.

(Continued)

The computer program product is adapted to implement part or all of the steps of the method of the invention.
The EAM system comprises computing navigation means implementing the method of the invention.

19 Claims, 20 Drawing Sheets

(51) Int. Cl.
*G06T 7/11* (2017.01)
*G06T 7/187* (2017.01)

(56) References Cited

U.S. PATENT DOCUMENTS

| | | | | |
|---|---|---|---|---|
| 2011/0252871 | A1* | 10/2011 | Nagoshi | G01N 11/142 |
| | | | | 73/54.02 |
| 2014/0249790 | A1* | 9/2014 | Spilker | G06T 7/11 |
| | | | | 703/11 |
| 2017/0103527 | A1* | 4/2017 | Steghofer | G06T 7/0012 |

* cited by examiner

COMPUTER IMPLEMENTED METHODS FOR IDENTIFYING CHANNELS IN A 3D VOLUME AND COMPUTER PROGRAM PRODUCT IMPLEMENTING THE METHODS

TECHNICAL FIELD

The present invention generally concerns, in a first aspect, to a computer implemented method for identifying channels in a 3D volume, and more particularly to a method comprising automatically identifying the possible channels by means of automatically obtaining candidate channel regions.

A second aspect of the invention concerns to a method for identifying channels in a 3D volume, and more particularly to a method comprising automatically identifying possible channels by means of automatically obtaining candidate channel volumes.

The invention also relates, in a third aspect, to a computer program product which implements the steps of the method of the first aspect of the invention.

A fourth aspect relates to an Electro Anatomical Mapping (EAM) system comprising computing navigation means implementing the method of the first aspect.

The term channel has to be understood in the present invention in a broad meaning as any passage-like structure which communicates or had communicated in the past (in the case of a blocked passage) two distant areas, such as, among others, a gas or fluid channel, a blood channel, a mechanical crack and an electrically conductive channel.

STATE OF THE ART

The identification of myocardium conductive channels has emerged as a need from the field of electrophysiology (EP), a medical speciality of cardiology intended to treat patients with arrhythmia. Arrhythmias can result from many causes, among these the scarring of heart tissue, such as that caused by a heart attack. In addition, cardiac arrhythmias can occur in any of the heart chambers and can also be classified according to the heart rate they produce. In particular, in this discussion we will focus on scar-related Ventricular Tachycardia (VT), which might be due to the presence of anomalous conducting channels (CC) within the Left Ventricle (LV), also called re-entry channels. If a heart attack produces scar tissue within the myocardium, and this scar is such that it has channels within itself, these channels, which are due to the presence of viable myocytes inside the scar tissue, can generate re-entrant circuits associated with VT. Effective treatment of scar-related VT can be performed with radio-frequency ablation using a catheter that is inserted into the arteries to reach the endocardium or the epicardium. Once there, the catheter is used by the EP to produce a lesion on the CC in the muscle of the heart, at a location that will stop the arrhythmia from happening. This location has to be identified carefully to avoid creating lesions on viable tissue that is not contributing to the arrhythmia problem.

Currently, EP uses a 'navigation' device to perform an electro-anatomical mapping of the endocardium. The navigation device uses 3D tracking technology to compute the position of the tip of the catheter. The anatomy of the patient's heart is available from the volumetric scans obtained from CT or MR devices. The volumetric scans produce 'frozen' pictures at the end of systole. During the catheter intervention, the volumetric scan can be registered with the heart of the patient, based on the coordinate system collected by the catheter while in the myocardium. This allows the navigation system to display the heart (usually a polygonal mesh extracted from the volumetric data corresponding to the endocardium wall) together with a picture of the catheter, in 3D. The catheter also can read voltages from its tip to measure the electrical activity on the heart walls. This is used to map the endocardium and the epicardium walls, by moving and dragging the tip along the wall to obtain as many readings as possible in order to obtain as complete a picture as possible of the voltages. The voltage indicates the condition of the heart muscle, with scar tissue signal at the lower end of the range, and healthy tissue giving the maximum. This is a laborious process that usually requires a few hundred point readings. These readings are interpolated by the navigation device to produce a map of the voltages. Then, the EP tries to induce arrhythmias by pacing the heart in different points along its conduction paths, in order to identify the sources of abnormal electrical activity. Using the visual information provided by the voltage map, the EP has to decide where to ablate to stop the arrhythmia. Once located the best point, the catheter is repositioned, and RF is used to produce a lesion to the muscle. Then the EP tries to induce arrhythmia, and if it does not recur, the patient is considered successfully treated.

This process takes three to four hours. This limits the number of patients that can have access to this treatment. And is tiring for the clinical team, as well as hazardous since it involves certain amount of fluoroscopy to monitor the position of the catheter at certain interval of the intervention (not during the mapping itself, but during the initial stages, when there is no registration of the catheter to the patient, and some other times in between). Such process of three to four hours long also entails a high risk for the patient health.

US 2009/0076375 A1 discloses providing imaging means in an ablation catheter, for a subsequent ablation process, which allows automatically identifying "damaged conduction path tissue" by processing the obtained 3D images according to program means execute in a control device, by implementing image processing algorithms, for example which typically allow edge detection or allow deviations in structure in specific areas of an image or patterns to be detected.

The automatic identification is performed on the tissue containing damaged conduction paths, but not on the conduction path itself.

Recently, with the arrival of a MR protocol known as Delayed Enhancement MR, it has become possible to visualize the scar tissue in the heart (in patients without a defibrillator; next generation defibrillators will be DE-MRI compatible and this limitation will disappear). These DE-MRI volumes capture information from the health of muscle cells to reveal which ones belong to scar and which to healthy tissue, as defined by a range of intensity signal values that put scar as the highest and healthy as the lowest. Viable tissue cells inside the scar tissue can have intensity values in between the range of scar and healthy tissue and are classified as Border Zone (BZ). The DE-MRI volumes can be visualized in several ways to produce an image to be interpreted visually by the EP, in order to determine where the possible CCs that induce arrhythmia are. Since these CCs are three dimensional (they can run within the myocardium in any direction, either along the walls or in between them) and they are embedded within the myocardium, which is also a volume, they are hard to visualize. This requires processing the DE-MRI volume to identify the endo and epicardium surfaces in order to be able to focus the visualization on the myocardium. If the endo and epi are identified in the LV then the values of scar, Border Zone and healthy tissue can be interpreted more clearly and not be confused with blood within the LV.

There are several ways to visualize the resulting myocardium. The simplest is to perform multiplanar reformatting to the volume, to show the values as intensities along planes that cut through the volume. This is usually done either along the acquisition planes, or by defining new axis on the volume corresponding to patient anatomy, like for example the short axis of the LV.

Another visualization method is to 'render' the myocardium as a volume as it would be seen were it a real object, using perspective projection and 'shading' technique.

The present inventors developed a visualization technique that starts from the segmented walls of the endo and epicardium (see [7] for the segmentation approach used), and interpolates a variable number of surfaces in between (see [2] for the visualization method). These surfaces, or Layers, are polygonal meshes, and their number should be made optimal to capture all the information within the myocardium. Too few layers and one could miss a CC, and too many and one would be spending time and resources in duplicating information.

The interpolated surfaces, following a principle similar to the layers of an onion, intersect the myocardium and where they do they take the corresponding value of the DE-MRI. The value assigned to the surface is color-coded to help with the visualization.

In particular, high values (scar) are made red, low values are made violet (healthy tissue), and intermediate values green (border zone). The thresholds used to assign colours to surface values can be controlled by the user.

The EP visually inspects each layer to detect a channel. Since channels are normally running inside the myocardium, usually a 10% deeper, and can even run perpendicular to the interpolated layers, it is easy to miss them using visual inspection. Inspecting CC on a single layer depends greatly on the experience of the EP. This involves manually rotating the myocardium to see all the possible angles, and to do that for all the layers created. The more layers generated, the more accurate the visualization and the less of a chance to miss a conducting channel that may fall in between layers. But at the same, the more time consuming the process becomes. But this only covers the CC running along a Layer. It is very hard for the human eye to follow a potential CC across layers, since it involves switching between layers and keeping track of the ins and outs of the CC.

Moreover, reference [8] also discloses identifying conducting channels from 3D volumetric data obtained from ceMRI, by means of signal intensity distribution, which makes the above mentioned Healthy (H), Border Zone (BZ) and Scar (S) tissue zones definition, although in this case the BZ is referred as heterogeneous tissue. In [8] the final CC identification is performed by visual inspection, and they refer to the whole heterogeneous tissue (HT) as being a conductive channel (called HT channel), not specifying that a more accurate identification of a conductive channel within the heterogeneous tissue is performed.

Reference [16] describes the state of the art regarding the newest developments in computational cardiology, including the use for, among others, ventricular tachycardia, of 3D cardiac models and their use in diagnostic procedures. None of said newest developments discloses a complete automatic identification of conducting channels.

Such a complete automatic identification of CCs is only known from other kind of source which is not 3D image data, as is the case of U.S. Pat. No. 6,236,883 B1 and JP 2008237882 A, the former using ECG features while the latter uses pace mapping. To sum up, the computer implemented methods for identifying channels in a 3D volume using a layered approach already known, are only automatic until the different zones are shown in a display in order to allow the electrophisiologist to visually identify the CCs, i.e. this last step is not performed automatically. This is the case of [7] and of a software implementation thereof developed by the present inventors [5].

Some other publications are available describing said software and the results obtained with its application on real cases [1][2][3].

Other publications are available, which can be considered as prior art to the present invention, but which do not either disclose the complete automatic identification of CCs. Some research groups have been working on the post-processing of DE-MRI cardiac images, and some of them developed and published methods to assess post-infarction scar characteristics associated with VT. See [4], [9], [10] and [11].

Other examples of available commercial tools for 3D visualization and segmentation of the heart are:
  CMRtools (http://www.cmrtools.com)
  TomTec (http://www.tomtec.de)
  Segment (http://medviso.com/products/segment/)

US 2011/224962 A1 discloses a system which simulates stimulation of scar tissue identified in a 3D model of a patient heart generated from 3D voxels obtained from image data segmentation of a 3D volume image element comprising said patient heart, together with impaired tissue and normal heart tissue, according to luminance intensity thresholds.

A stimulation processor simulates electrical stimulation of the patient heart using the model to identify risk of heart impairment.

The system automatically identifies risk for rapid, potentially dangerous heart rhythms and myocardial infarctions by simulation of ventricular tachycardia circuits using in-vivo MRI and a simplified computer model of cardiac electrophysiology for non-invasive risk stratification for sudden cardiac death.

The automatic identification disclosed by US 2011/224962 A1, and performed in the segmented 3D voxels, is only related to said scar tissue, impaired tissue and normal heart tissue areas identification.

Although US 2011/224962 A1 admits the influence of re-entrant circuits around the infarct scars in ventricular tachyarrhythmias, indicating that said circuits can be complex containing areas of slow conduction and multiple pathways of re-entry, no automatic identification of any of said pathways, nor of any channels or of any other element within any of said identified areas is disclosed at all in US 2011/224962 A1. In other words, ventricular tachycardia circuits are only simulated but not automatically identified at all.

No method is known in the state of the art which performs said last step, i.e. the one regarding the identifying of the conductive channels, automatically, regarding the myocardium conductive channels.

In addition to said identification of myocardium conductive channels, there are many other application fields where many type of objects include zones not well identified which are susceptible to include channels which are wanted to be identified, such as subterraneous gas or fluid channels in the field of geophysical exploration, cracks in the mechanical industry or any kind of channels in the medical or veterinary field.

No method is known in the state of the art which performs the automatic identification of such channels of said other application fields.

On the other hand, dilation, erosion, opening and closing are morphological operations common in image processing, and particularly the use of dilation for segmentation is well known in the art.

In fact, dilation is used, for example, for guiding the region growing segmentation in almost all the evolutive algorithms, such is the case of references [17], [18] and [19], all of them related to the use of image dilation for segmentation purposes.

The present inventors don't know any proposal disclosing the use of dilation for identifying channels in a 3D volume nor for the identification of any element which is not the one being submitted to dilation, but an intermediate element located between elements being submitted to dilation.

REFERENCES

[1] A. Berruezo, J. Fernandez-Armenta, O. Camara, E. Silva, L. L. Mont, D. Andreu, A. Frangi, J. Brugada, *Three-dimensional architecture of scar and conducting channels based on high resolution CE-CMR. Insights for ventricular tachycardia ablation*, European Heart Journal (2011) 32 (Abstract Supplement), 943.

[2] Fernandez-Armenta, J. Camara, O. Silva, E. Mont, L. Andreu, D. Sitges, M. Herzcku, C. Frangi, A. F. Brugada, J. Berruezo, A. *Three-dimensional Architecture Of Scar And Conducting Channels Based On High Resolution CE-CMR. Insights For Ventricular Techycardia Ablation*, Heart Rhythm Society's Annual Scientific Sessions, Moscone Center, 2011.

[3] Berruezo A, Fernández-Armenta J, Mont L, Zeljko H, Andreu D, Herczku C, Boussy T, Tolosana J M, Arbelo E, Brugada J., *Combined Endocardial and Epicardial Catheter Ablation in Arrhythmogenic Right Ventricular Dysplasia Incorporating Scar Dechanneling Technique*, Circ Arrhythm Electrophysiol. (2011) Dec. 28.

[4] Adrianus P. Wijnmaalen, Rob J. van der Geest, Carine F. B. van Huls van Taxis, Hans-Marc J. Siebelink, Lucia J. M. Kroft, Jeroen J. Bax, Johan H. C. Reiber, Martin J. Schalij, and Katja Zeppenfeld Department of Cardiology, *Head-to-head comparison of contrast-enhanced magnetic resonance imaging and electroanatomical voltage mapping to assess post-infarct scar characteristics in patients with ventricular tachycardias: real-time image integration and reversed registration*, European Heart Journal (2011) 32, 104-114.

[5] Valeria Barbarito, Luigi Carotenuto, Luis Serra, Oscar Càmara, Juan Fernandez-Armenta, Antonio Berruezo, Alejandro Frangi, *A software application for three-dimensional visualization and quantification of scars and conducting channels based on pre-procedure CE-MRI in patients with ventricular tachycardia*, CARS 2012, Jun. 27-30, Pisa, Italy.

[6] Larrabide I, Omedas P, Martelli Y, Planes X, Nieber M, Moya J A., Butakoff C, Sebastian R, Camara O, De Craene M, Bijnens B H, Frangi A F, *GIMIAS: An Open Source Framework for Efficient Development of Research Tools and Clinical Prototypes, Func Imaging and Modeling of the Heart*, ser. Lecture Notes in Computer Science (2009), vol. 5528, pp. 417426.

[7] Hans C. van Assen, Mikhail G. Danilouchkine, Alejandro F. Frangi, Sebastian Ordas, Jos J. M. Westenberg, Johan H. C. Reiber, Boudewijn P. F. Lelieveldt, SPASM: A 3D-ASM for segmentation of sparse and arbitrarily oriented cardiac MRI data, Medical Image Analysis 10 (2006) 286-303.

[8] Esther Perez-David, Ángel Arenal, José L. Rubio-Guivernau, Roberto del Castillo, Leonardo Atea, Elena Arbelo, Eduardo Caballero, Veronica Celorrio, Tomas Datino, M D, Esteban Gonzalez-Torrecilla, Felipe Atienza, Maria J. Ledesma-Carbayo, Javier Bermejo, Alfonso Medina, Francisco Fernandez-Avilés. *Noninvasive Identification of Ventricular Tachycardia-Related Conducting Channels Using Contrast-Enhanced Magnetic Resonance Imaging in Patients With Chronic Myocardial Infarction Comparison of Signal Intensity Scar Mapping and Endocardial Voltage Mapping*, JACC 2011:184-94.

[9] Oakes R S, Badger T J, Kholmovski E G, Akoum N, Burgon N S, Fish E N, Blauer J J, Rao S N, DiBella E V, Segerson N M, Daccarett M, Windfelder J, McGann C J, Parker D, MacLeod R S, Marrouche N F., *Detection and quantification of left atrial structural remodeling with delayed-enhancement magnetic resonance imaging in patients with atrial fibrillation*, Circulation. 2009 Apr. 7; 119(13):1758-67.

[10] http://www.alumni.utah.edu/u-news/august09/?display=life-saving-companies.html

[11] Marcos Daccarett, Troy J. Badger, Nazem Akoum, Nathan S. Burgon, Christian Mahnkopf, Gaston Vergara, Eugene Kholmovski, Christopher J. McGann, Dennis Parker, Johannes Brachmann, Rob S. MacLeod, and Nassir F. Marrouche, *Association of Left Atrial Fibrosis Detected by Delayed-Enhancement Magnetic Resonance Imaging and the Risk of Stroke in Patients With Atrial Fibrillation*, J Am Coll Cardiol, 2011; 57:831-838.

[12] N. Nikopoulos et al. *An efficient algorithm for 3d binary morphological transformations with 3d structuring elements for arbitrary size and shape*. IEEE Transactions on Image Processing. Vol. 9. No. 3. 2000. pp. 283-286.

[13] Dijkstra, E. W. *A note on two problems in connexion with graphs*. Numerische Mathematik (1959) 1: 269-271.

[14] Markos G. Tsipouras, Dimitrios I. Fotiadis, Lambros K. Michalis: IGI Global: Computer-Aided Diagnosis of Cardiac Arrhythmias (9781605660264): Book Chapters

[15] Cormen, Thomas H.; Leiserson, Charles E.; Rivest, Ronald L.; Stein, Clifford (2001). "Section 24.3: Dijkstra's algorithm". Introduction to Algorithms (Second ed.). MIT Press and McGraw-Hill. pp. 595-601. ISBN 0-262-03293-7.

[16] Computational cardiology: the heart of the matter. Dr. Natalia Trayanova. Department of Biomedical Engineering and Institute for Computational Medicine Johns Hopkins University. 2012.

[17] Lei Wang, Xin Gao, Guizhi Zhang. *3D region growing algorithm driven by morphological dilation for airway tree segmentation in image guided therapy*. Journal of biomedical engineering; 2013 August; 30(4):679-83, 691.

[18] Jakub Smotka. *Watershed based region growing algorithm*. Annales UMCS Informatica. Al 3 (2005) 169-178.

[19] M H Siddiqi, I Ahmad, S Bt Sulaiman. *Weed Recognition Based on Erosion and Dilation Segmentation Algorithm*. Singapore 2009, Apr. 17-Apr. 20. International Conference on Education Technology and Computer ISBN: 978-0-7695-3609.

DESCRIPTION OF THE INVENTION

It is necessary to provide an alternative to the state of the art which covers the gaps found therein, particularly those related to the lack of proposals which perform an automatic identification of channels in a 3D volume.

To that end, the present invention relates, in a first aspect, to a computer implemented method for identifying channels in a 3D volume, which comprises:

a) obtaining a 3D volume of the object, based on physical parameter values representative of physical properties of said object, containing, directly or on a sub-volume isolated therefrom, at least two different sub-volumes identified, based on said physical parameter values, as: well-defined zone and not-well-defined zone; and b) generating well-defined zone and not-well-defined zone patches from, respectively, said at least two sub-volumes.

Contrary to the known methods, where the patches generated at b) are only displayed in order to allow a skilled person to perform visually the accurate identification of the channels, the method of the present invention comprises, in a characteristic manner:

c) automatically identifying possible channels by means of automatically obtaining candidate channels regions, as follows:
   c.1) dilating at least the perimeters of the well-defined zone patches;
   c.2) considering as candidate channel points the perimeter points that intersect the perimeter of adjacent well-defined zone patches, and/or the perimeter points that intersect with the same perimeter of the same well-defined zone patch, before reaching a maximum dilation and lie within a not-well-defined zone patch (because said well-defined zone patches are partially or completely surrounded by a not-well defined zone patch), and
   c.3) considering that adjacent candidate channel points form a candidate channel region.

Obviously, said dilation of sub-step c.1) is not performed for segmentation purposes, but for performing the detection of said intersecting perimeter points and their consideration as candidate channel points at sub-step c.2).

Depending on the embodiment, said physical parameter is associated to at least one of absorption or reflection of light, magnetic or electromagnetic radiation, temperature, electricity, signal intensity, signal phase, time, frequency and colour, etc., or a combination thereof, and their values are obtained as a response to any known 3D volume generating technique, such as an X-rays based technique for obtaining X-rays absorbance parameter values, an ultrasound exploration based technique for obtaining TOF (Time of Flight) values of reflected ultrasound waves, a MRI technique for obtaining RF signals emitted by tissues submitted to a magnetic field, etc.

For a first preferred embodiment, the method of the first aspect of the invention comprises performing said channels identification using a layered approach, as follows:
   performing said patches generation of step b) by means of:
     b.1) defining a series of layers representing sections of at least part of the 3D volume or of said sub-volume isolated therefrom, said layers being polygonal meshes; and
     b.2) generating patches regarding well-defined zone and not-well-defined zone, from the intersection of the at least two sub-volumes with the layers, defined at b.1), interpolated therein; and
   performing said automatic identification of step c) bi-dimensionally on at least one of the defined layers, where the dilation of said sub-step c.1) is performed regarding the well-defined zone patches included in said at least one of the defined layers, and said sub-step c.2) comprises considering as candidate channel points the perimeter points that intersect the perimeter of adjacent well-defined zone patches.

For a variant of said first preferred embodiment, that was conceived by the present inventors prior to the rest of variants:
   said at least two different sub-volumes are at least three sub-volumes identified, based on voxel intensity values and/or colour values, as: first defined zone, second defined zone and not-well-defined zone, wherein said well-defined zone is said second defined zone;
   said step b) comprises generating first defined zone, second defined zone and not-well-defined zone patches from, respectively, said at least three sub-volumes; and
   said sub-step b.2) comprises generating patches regarding first defined zone, second defined zone and not-well-defined zone, from the intersection of the at least three sub-volumes with the layers, defined at b.1), interpolated therein.

In other words, for said prior conceived variant of said first preferred embodiment, the method of the first aspect of the invention comprises:

a) obtaining a 3D volume of the object containing at least three different sub-volumes identified, based on voxel intensity values and/or colour values, as: first defined zone, second defined zone and not-well-defined zone;

b) generating first defined zone, second defined zone and not-well-defined zone patches by means of:
   b.1) defining a series of internal surfaces or layers representing sections of at least part of the 3D volume or of a sub-volume isolated therefrom; and
   b.2) generating patches regarding first defined zone, second defined zone and not-well-defined zone, from the intersection of the at least three sub-volumes with the layers, defined at b.1), interpolated therein;

c) automatically identifying the possible channels by means of automatically obtaining candidate channel regions bi-dimensionally on at least one of the defined surfaces, as follows:
   c.1) dilating at least the perimeters of the second defined zone patches included therein;
   c.2) considering as candidate channel points the perimeter points that intersect the perimeter of adjacent second defined zone patches before reaching a maximum dilation and lie within a not-well-defined zone patch, and
   c.3) considering that adjacent candidate channel points form a candidate channel region.

For a second preferred embodiment of the method of the first aspect of the invention:
at step a):
   said obtaining of said 3D volume comprises obtaining an Electro Anatomical Mapping, EAM, 3D volume from memory means; and
   said well-defined zone (generally core tissue) and not-well-defined zone (generally border zone tissue) sub-volumes are identified based on values of an electrical parameter and/or of a parameter associated thereto;
the method comprising:
   performing said patches generation of step b) by means of:
     b.1) retrieving at least one EAM 3D polygonal mesh (i.e. a polygonal mesh with a 3D shape) from said EAM 3D volume or said sub-volume isolated therefrom; and b.2) generating patches regarding well-defined zone and not-well-defined zone on respective zones of said at least one EAM 3D polygonal mesh coincident with or constituted by the at least two identified sub-volumes;

and performing said automatic identification of step c) bi-dimensionally on said at least one EAM 3D polygonal mesh, where the dilation of said sub-step c.1) is performed regarding the well-defined zone patches included in said at least one EAM 3D polygonal mesh, and said sub-step c.2) comprises considering as candidate channel points the perimeter points that intersect the perimeter of adjacent well-defined zone patches.

Generally, said at least one EAM 3D polygonal mesh is said EAM 3D volume or said sub-volume isolated therefrom (then, the retrieving of sub-step b.1) consists only in taking the EAM 3D volume or the sub-volume isolated therefrom), and said well-defined zone and not-well-defined zone patches are constituted by the at least two identified sub-volumes.

For a variant of said second preferred embodiment:
said at least two different sub-volumes are at least three sub-volumes identified as: first defined zone, second defined zone and not-well-defined zone, wherein said well-defined zone is said second defined zone;
said step b) comprises generating first defined zone, second defined zone and not-well-defined zone patches from, respectively, said at least three sub-volumes; and
said sub-step b.2) comprises generating patches regarding first defined zone, second defined zone and not-well-defined zone on respective zones of said at least one EAM 3D polygonal mesh coincident with or constituted by the at least three identified sub-volumes.

Volumetric EAM: As the devices that obtain voltage mappings on the surfaces of the heart (endo or epi-cardium) by single or multiple point catheters get more sophisticated, they will also be able to measure (or infer by methods such as interpolation from endo to epi, or any other means) the internal electrical activity of the myocardium. When such internal electrical information of the myocardium is available, the same methodology of creating interpolated layers between endo and epi-cardium would be applicable to the detection of channels. In other words, in case several of said EAM 3D polygonal meshes, adjacent to each other, are available, the layered approach of the first preferred embodiment can also be used combined with said second preferred embodiment, where well-defined and not-well-defined patches are obtained from the intersection of the layers with the identified sub-volumes comprising contiguous areas of the adjacent EAM 3D polygonal meshes.

For a variant of the first and also of the second preferred embodiments of the method of the present invention, step c) comprises automatically obtaining candidate channel regions bi-dimensionally on at least two of the defined layers or on at least two EAM 3D polygonal meshes, preferably on each layer or on each EAM 3D polygonal mesh, by means of said steps c.1) to c.3).

The dilation of step c.1) is performed, for a variant of the first and second preferred embodiments of the method of the invention, radially and uniformly.

According to a variant of the first and second preferred embodiments, the method further comprises a step d) for identifying the possible channels by means of automatically obtaining candidate channel regions three-dimensionally across at least two layers of said layers defined at b.1) or across at least two EAM 3D polygonal meshes retrieved at b.1), for finding channels running through different layers or different EAM 3D polygonal meshes.

The method comprises, for an implementation of said variant of the first and second preferred embodiments, performing said step d) as follows:

d.1) for each not-well-defined zone patch in a layer or EAM 3D polygonal mesh whose perimeter is completely surrounded by a second defined zone patch, a representative number of points of the not-well-defined zone patch are classified as candidate channel points;

d.2) for each not-well-defined zone patch containing candidate channel points, these are projected towards at least two other of said layers or EAM 3D polygonal meshes to check for intersections, and when they fall on a first defined zone patch or when they fall on a not-well-defined zone patch which perimeter is at least in part in contact with a first defined zone patch they are classified as candidate exit points; and d.3) candidate channel regions are defined as those regarding a path running across layers or EAM 3D polygonal meshes through links connecting two groups of candidate exit points, and containing one or more candidate channel points.

Said step d.2) further comprises, optionally, for those candidate channel points of a not-well-defined zone which as a result of said projections fall on a not-well-defined zone patch, of the layer or EAM 3D polygonal mesh on which they are projected, whose perimeter is completely surrounded by a second defined zone patch, considering a representative number of points of said not-well-defined zone patch are classified as candidate channel points, and classifying both groups of candidate channel points as linked.

The method comprises, for an embodiment, performing said projections of step d.2) towards a plurality of said layers or EAM 3D polygonal meshes, in a number bigger than two, until said two groups of candidate exit points are found, at step d.3), on two respective layers or EAM 3D polygonal meshes.

Different algorithms can be used in order to automatically verify the existence of the links between each pair of groups of candidate exit points, one per layer or EAM 3D polygonal mesh, such as, for an embodiment, graphs and search algorithms.

Finally, the method preferably comprises performing a merging of the results of steps c.3) and d.3) and an automatic filtering of the candidate channel regions according to predetermined requirements of the specific application field.

For a third preferred embodiment of the method of the first aspect of the invention, here called as volume approach, the above mentioned patches are volume patches and the candidate channel regions are candidate channel volumes, the method comprising performing the dilation of sub-step c.1) three-dimensionally on the well-defined zone volume patches.

For a variant of said third preferred embodiment, the dilation is performed uniformly and perpendicularly to every point of the faces of each well-defined zone volume patch:
for the faces of the external perimeter of the well-defined zone volume patch, in order to consider, at sub-step c.2), as candidate channel points, corresponding to voxels of a candidate junction volume, the external perimeter points that intersect the external perimeter of adjacent well-defined zone volume patches, and/or
for the faces of the internal perimeter of the well-defined zone volume patch, in case the well-defined zone volume patch has a hole or cavity there within, in order to consider, at sub-step c.2), as candidate channel points, corresponding to voxels of a candidate hole volume, the internal perimeter points that intersect with other points of the same internal perimeter of the same well-defined zone patch.

According to an implementation of said variant of the third preferred embodiment:

said sub-step c.1) further comprises three-dimensionally eroding at least the already dilated perimeters of the well-defined zone volume patches;

comparing the well-defined zone volume patches before being dilated with themselves once dilated and erosioned at least once; and if as a result of said comparison a difference is detected, said sub-step c.2) further comprises considering the points resulting from that difference and belonging to a not-well-defined zone as candidate channel points constituting:

for the faces of the internal perimeter of the well-defined zone volume patch: a potentially candidate hole volume passing through said well-defined zone volume patch, wherein said intersection of internal perimeter points is indirectly detected as a result of said detected difference; or for the faces of the external perimeter of the well-defined zone volume patch: a potentially candidate junction volume between at least two adjacent well-defined zone volume patches.

A second aspect of the invention concerns to a computer implemented method for identifying channels in a 3D volume, also here called as volume approach, which comprises:

i) obtaining a 3D volume of the object containing, directly or on a sub-volume isolated therefrom, at least two different sub-volumes identified, based on physical parameter values representative of physical properties of said object, as: well-defined zone and not-well-defined zone; and ii) generating well-defined defined zone and not-well-defined zone volume patches from, respectively, said at least two sub-volumes.

Contrary to the known methods, the one of the second aspect of the invention further comprises:

iii) automatically identifying the possible channels by means of automatically obtaining candidate channel volumes, as follows:

iii.a) three-dimensionally dilating at least the perimeters of the well-defined zone volume patches, and three-dimensionally eroding at least the already dilated perimeters of the well-defined zone volume patches;

iii.b) comparing the well-defined zone volume patches before being dilated with themselves once dilated and erosioned at least once; and iii.c) if as a result of said comparison a difference is detected, considering the points resulting from that difference and belonging to a not-well-defined zone as candidate channel points constituting:

for the faces of an internal perimeter of the well-defined zone volume patch: a potentially candidate hole volume passing through said well-defined zone volume patch; or for the faces of an external perimeter of the well-defined zone volume patch: a potentially candidate junction volume between at least two adjacent well-defined volume patches.

For an embodiment of the second aspect of the invention and manner of performing said implementation of said variant of the third preferred embodiment, the method comprises performing a plurality of said dilations followed by a plurality of said erosions, and then perform said comparison.

Alternatively, the method comprises performing a plurality of iterations including one dilation followed by one erosion, and perform said comparison after each of said iterations.

For an embodiment of said volume approaches:

said at least two different sub-volumes are at least three sub-volumes identified as: first defined zone, second defined zone and not-well-defined zone, wherein said well-defined zone is said second defined zone;

said step b) comprises generating first defined zone, second defined zone and not-well-defined zone patches from, respectively, said at least three sub-volumes; and wherein the method comprises, in order to discard cavities, determining that said potentially candidate hole volume or said potentially candidate junction volume corresponds to a candidate channel volume if at least two ends thereof contact first defined zone patches or not-well-defined zone volume patches Said two ends can be ends of one and the same hole volume, or junction volume, or in case said hole volume or junction volume is formed by a plurality of hole sub-volumes, or junction sub-volumes, communicated with each other forming a path, said two ends are the ends of said path.

For a variant of said embodiment, the method of the first aspect and the method of the second aspect both comprise applying a morphological skeletonization algorithm to the candidate channel volume to find the centre line of the channel.

For an embodiment, the method of the first and second aspects of the present invention is applied to a medical or veterinary field, preferably to the automatic detection of channels in internal organs, such as the heart, brain, lungs, etc.

For said preferred embodiment applied to internal organs, said channels are generally electrically conductive channels, in which case the well-defined zone is a non-conductive zone, or blood channels, in which case the well-defined zone is a low blood supply zone, or tumour channels, in which case the well-defined zone is a tumour zone.

For said embodiment for which the well-defined zone is a second defined zone and there is also a first defined zone, when said channels are electrically conductive channels the first defined zone and second defined zone are, respectively, conductive and non-conductive zones, when the channels are blood channels, the first defined zone and second defined zone are, respectively, healthy and low blood supply zones, and when the channels are tumour channels, the first defined zone and second defined zone are, respectively, healthy and tumour zones.

For a more preferred embodiment, said channels are myocardium conducting channels, the first defined zone, second defined zone and not-well-defined zone corresponding to, respectively, a healthy tissue zone, a scar tissue zone and a border tissue zone, and said sub-volume of said sub-step b.1) is a myocardium 3D volume.

For another embodiment, the method is applied to geophysical exploration, to identify fluid channels, in which case the well-defined zone is a zone non containing or not susceptible of containing fluid (such as a rock).

For said embodiment for which the well-defined zone is a second defined zone and there is also a first defined zone, and when the method is applied to geophysical exploration, to identify fluid channels, the first defined zone and second defined zone are, respectively, a zone containing fluid or susceptible of containing fluid (such as a subterraneous cavity) and a zone non containing or not susceptible of containing fluid (such as a rock). In this case, the not well defined zone is a zone which could contain fluid, such as a sandy zone.

Another application of the method of the present invention is, for another embodiment, the one relating to the identification of cracks in a mechanical part, structure or device.

The method of the present invention provides an automatic and operator-independent method to assess the presence of channels. In prior art, this action is not explicitly mentioned or, where mentioned, it is visually performed by the operator. The automatic detection of channels, such as conducting channels, allows detecting the presence of all channels in a shorter time, and it also allows detecting channels that are not easily detected by the operator, especially if running across more than one layer. In addition, a higher number of layers can be analysed and a bigger range of threshold values can considered.

A third aspect of the invention relates to a computer program product, which includes code instructions that when executed in a computer implement at least all the steps of the method of the first aspect of the invention except steps a) and b), or at least all the steps of the method of the second aspect of the invention except steps i) and ii).

For an embodiment of the third aspect of the invention, the computer program product includes code instructions that when executed in a computer implement all the steps of the method of the first or second aspects of the invention.

A fourth aspect of the present invention relates to an EAM system, comprising:
  a catheter having one or more electrodes for acquiring values of an electrical parameter (such as voltage) and/or of a parameter associated thereto, at different points of at least an endocardium and/or epicardium when travelling there through; and
  computing navigation means in communication with said catheter and comprising:
    locating means configured for collaborating with said catheter to locate its positions along said travelling through the endocardium and/or epicardium; and
    reading means configured for collaborating with said catheter to read the values acquired thereby;
  wherein said computing navigation means are configured and arranged for accessing said read values and located catheter positions, correlate them and build and store in memory means an EAM 3D volume therewith, and comprises a display for displaying at least part of said EAM 3D volume.

Contrary to the known EAM systems, in the EAM system of the fourth aspect of the present invention the computing navigation means implement the method of the first aspect of the invention for the above referred as second preferred embodiment (and variants thereof), for identifying myocardium conducting channels on the EAM 3D polygonal mesh retrieved thereby at sub-step b.1), and for displaying on said display at least the candidate channel region identified at sub-step c.3).

For an embodiment of the EAM system of the fourth aspect of the invention:
  said catheter is an ablating catheter; and
  said computing navigation means are configured for displaying in said display the identified candidate channels region together with at least part of said EAM 3D volume to visually guide an operator in the intraoperative use of said ablating catheter travelling towards a myocardium conducting channel in order to ablate it.

The advantage of using the EAM system of the fourth aspect of the invention intra-operatively is that it allows quickly identifying slow conduction channels on the EAM data at that point in time when time is critical in order to make a decision. Since the method runs within milliseconds on a single layer, the EP could obtain results as he adjust the thresholds that determine the boundaries between Healthy-BZ-Core and in real-time obtain the potential conducting channels corresponding to those thresholds. And if pre-operative detected channels on MRI data (obtained for example by the layered approach of the method of the first aspect of the invention) are available to view during the intervention, they could be matched against the intraoperative channels.

The EAM maps do not necessarily have to be obtained from a single point catheter but can also be obtained using other technologies, for example using catheters which incorporate multiple electrodes that can capture voltage from the endocardium simultaneously and thus can provide real-time updates (in the case of one manufacturer, Rhythmia Medical, it can do it using 64 electrodes). This would allow computing the detected channels as voltages are changing in real-time on the endocardium.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which:

(a) FIG. 9A is of BZ Patch 2 from Surface at 50% showing some Candidate Channel Points (CCP 2) projecting towards the Surface at 44% in order to find if there is an exit to healthy tissue in this layer; and (b) FIG. 9B is of Surface at 44% and the projection of BZ Patch 2 on BZ Patch 1, which indicates an exit towards healthy tissue. The bottom part of the CCP 2 are the Candidate Exit Points 1 (CEP1).

(a) FIG. 10A shows the Candidate Exit Points 1 (CEP1); and (b) FIG. 10B shows Candidate Exit Points 1 (CEP1) on BZ Patch 1.

FIG. 11B shows, indicated as P2, the perimeter of BZ Patch 2 projected on BZ Patch 4 of Surface 55%.

(a) FIG. 12A shows the Candidate Exit Points 4 (CEP4); and (b) FIG. 12B shows the Candidate Exit Points 4 in BZ Patch 4, i.e. CEP4 of CCR2.

DETAILED DESCRIPTION OF SEVERAL EMBODIMENTS

Figure 1:
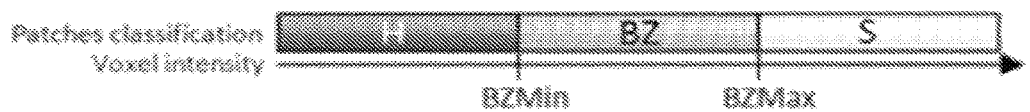
FIG. 1 shows the range of values for H, BZ and S patches for an embodiment of the method of the present invention.
Figure 2:
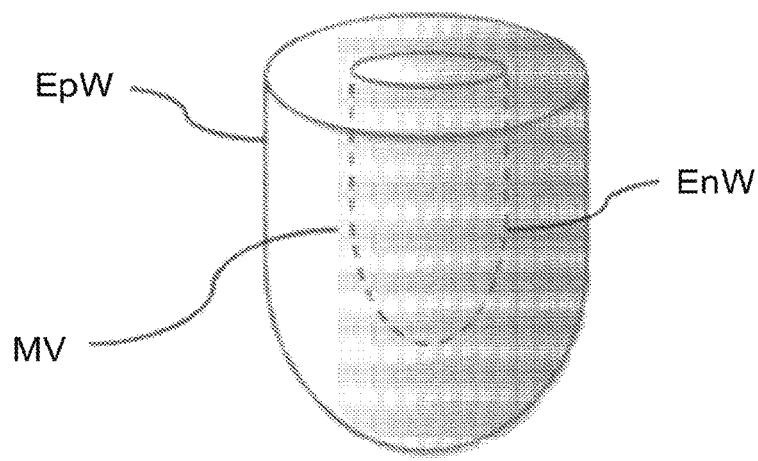
FIG. 2 is a schematic representation of the myocardium as a 3D volume MV, where the Endocardium wall (EnW) and the Endocarpium Wall (EpW) are shown.

A preferred embodiment of the invention is described below with reference to some of the accompanying drawings (FIGS. 1 to 22B), and relates to a computer based method to identify automatically CC in a 3D volume to provide the EP (electrophysiologist) with a list of all the potential CC candidates for arrhythmia, according to the above described layered approach.

By automating the process of obtaining the channels first of all an operator-independent method is provided. Secondly, the detection of channels that are not falling clearly on a layer, and run across layers, which is something not easily achieved by visual assessment by the clinician, is enabled.

The main motivation of this embodiment of the invention was to help planning the ablation procedure before the intervention, by presenting the CC to the EP. Having identified the CC ahead of the intervention, the EP can shorten the procedure by mapping with the catheter only the scar areas, and not areas that are clearly healthy. And it can minimize the amount of ablated tissue by studying the paths of the CC and choosing the optimal ablation point ahead of time.

The usefulness of this embodiment of the invention goes beyond this initial interventionalist purpose and can be applied to a population screening to identify in infarcted patients those who are likely to have arrhythmias in the future. This will allow identifying patients that would benefit from the implantation of an Implantable Cardiac Defibrillator (ICD) and/or the catheter ablation procedure.

According to this preferred embodiment of the invention, as already explained above, the method detects channels in the myocardium using interpolated layers inserted within the myocardium belonging to a volumetric image data of the human heart. Scar tissue is formed in the myocardium as a consequence of insufficient blood supply. A channel is a 3D path within the myocardium between two or more volumes of scar tissue. A channel has an entry point and an exit point. These channels can correspond to conducting corridors (CC) of the myocardium and are thus of interest to electrophysiologists to determine the optimal location for catheter ablation, in order to treat scar-related re-entering circuits inducing arrhythmias. At this stage, the volumetric acquisitions are obtained from a new modality of magnetic resonance imaging (MR), but the principles of the method should be applicable to other imaging acquisitions.

The method (also called below as CC Layered method) directly fits with the main software application that is currently under clinical research use at the "Hospital Clinic i Provincial de Barcelona (HCPB)". It is based on having previously identified the endo- and epicardium boundaries, and then on inserting interpolated polygonal surface layers within the myocardium.

The method works by processing the information on the surface layers to detect Single Layer Channel Regions and between layers to detect Multiple Layer Channel Regions. The order in which these two types of layers are detected doesn't matter; the two parts of the method could be run in parallel. The final output is a set of Candidate Channel Regions, defined as 3D polylines, from which the clinician selects those that do correspond to CCs.

This CC Layered method works as follows, for the preferred embodiment:

I. Generate Healthy (H), Border Zone (BZ) and Scar (S) Tissue Patches within the Myocardium Volume.

The method assumes that there exists a volumetric acquisition V obtained (for example by DE-MRI or any other imaging technique considered suitable for the application) from a 3D object (a heart, for example) using a protocol that assigns values to the volume elements (voxels) in such a way that different sub-volumes can be identified inside the myocardium volume based on the voxel intensity values: healthy tissue (H), border zone tissue (BZ) and core tissue of the scar (S). The BZ tissue has a range of intensities that go from those of H to those of S (see FIG. 1). The sub-volumes are classified based on two thresholds of voxel intensity signals, MinBZ and MaxBZ. These thresholds vary for each patient and can either be predefined or adjusted for each patient. The method can automatically repeat all the steps using a set of different threshold values contained in a predefined range of MinBZ and a predefined range of MaxBZ, thus providing a way to adapt to the values of the input volume. Whatever the approach, they will maintain the previously defined enclosing relationship. The channels run within the BZ, under certain topological constrain configurations.

I.1 Isolate the Myocardium Volume.

Given such volume V, the method requires as its input a series of surfaces. These surfaces lie within the walls of the endocardium and the epicardium (see FIG. 2). Thus, one pre-requisite is to obtain a subset of voxels of V that represent the myocardium.

I.2 Obtain Internal Surfaces.

Figure 3:
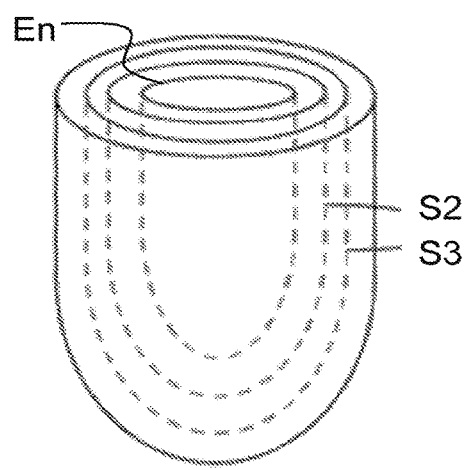
FIG. 3 shows the myocardium with interpolated surfaces.
Figure 4:
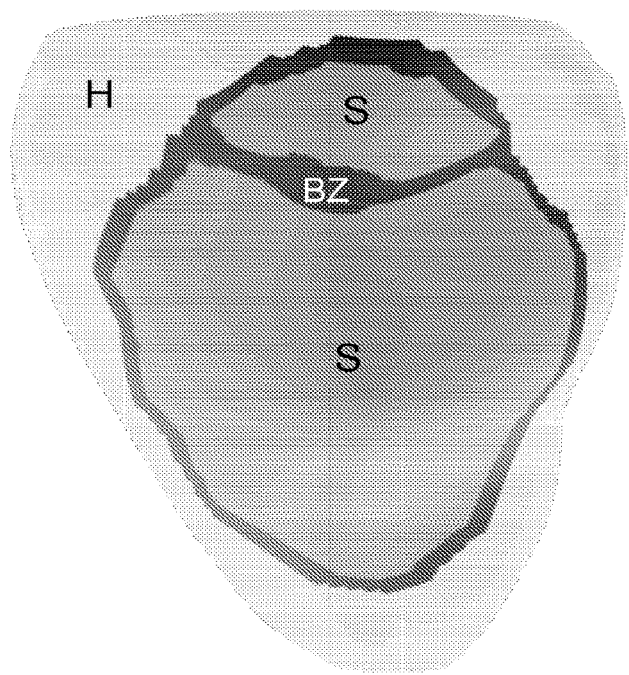
FIG. 4 shows one of the defined surfaces, according to the method of the invention, showing Healthy tissue (H), Border Zone tissue (BZ) and Scar tissue patches, where there is a potential Conducting Channel within the surface itself.
Figure 5:
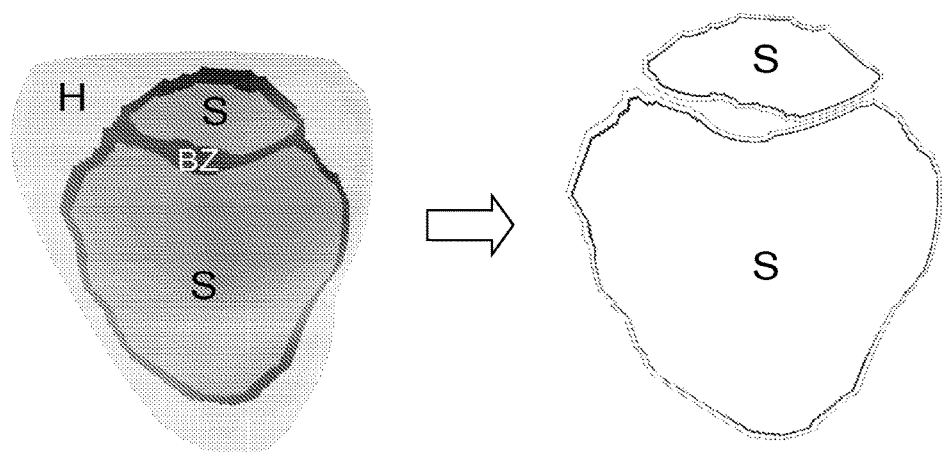
FIG. 5 is representative of the detection of channel in a single surface, particularly the one shown in FIG. 4, i.e. to the automatic identification of step c), where scar patches are identified, then isolated, and then their perimeters are dilated over the surface that contains them, as per sub-step c.1) of the method of the invention. Left view: LV surface divided in patches according to threshold value. Right view: Scar dilated perimeters.
Figure 6:
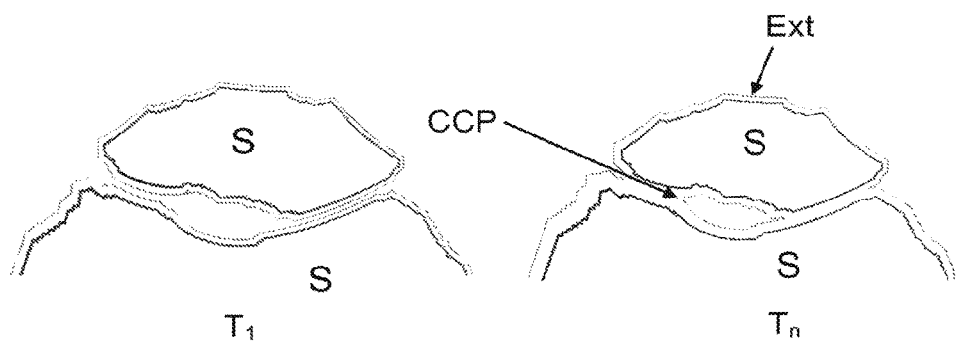
FIG. 6 shows, as part of the detection of channel in a single surface of FIG. 5, extra dilation steps at time-points $T_1$ (left) and $T_n$ (right). The perimeters of the two scar patches (S) are colliding in $T_n$, defining Candidate Channel Points (CCP). The extent of dilation is indicated as Ext.
Figure 7:
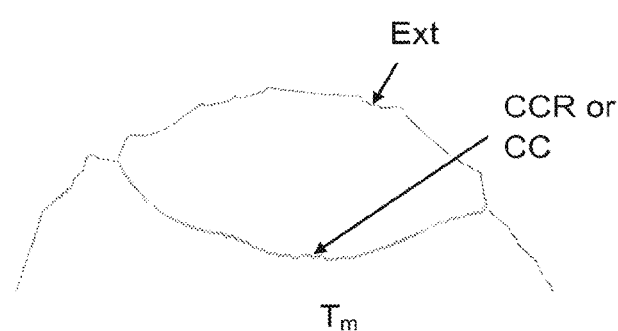
FIG. 7 shows, as part of the detection of channel in a single surface of FIGS. 5 and 6, how at time-point $T_m$ the dilation results of the Candidate Channel Points becomes a Candidate Channel Region (CCR), which if validated by the clinician could become a detected Conducting Channel (DC). In this case Ext is the extent of dilation at the end of iterations.
Figures 8A, 8B, 8C:
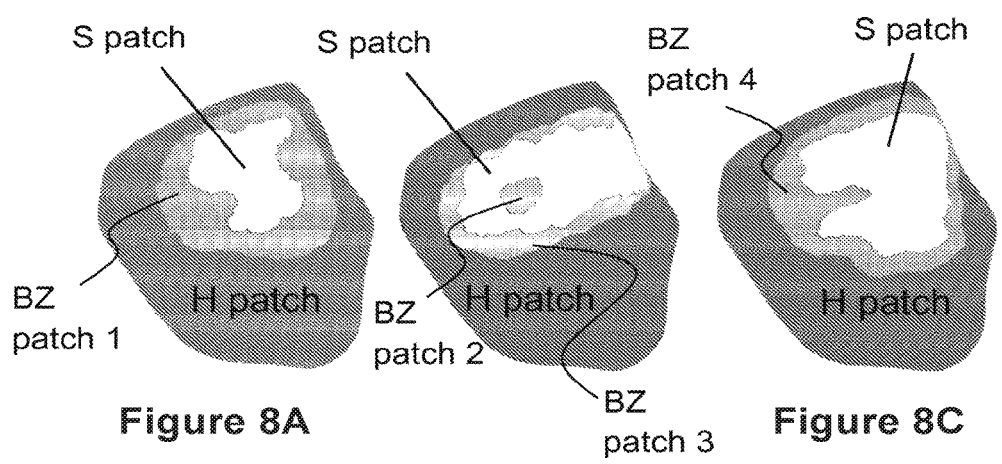
FIGS. 8A, 8B and 8C respectively show three surfaces at different depths from the myocardium, where view 8A corresponds to a surface at 50% depth from endocardium (also called S1), view 8B to a surface at 44% depth from endocardium (also called S2), and view 8C to a surface at 55% depth (also called S3), said surfaces being used to implement t step d) of the method of the invention, for an embodiment, i.e. to perform the automatic identification or detection of channel in multiple surfaces.
Figure 9A:
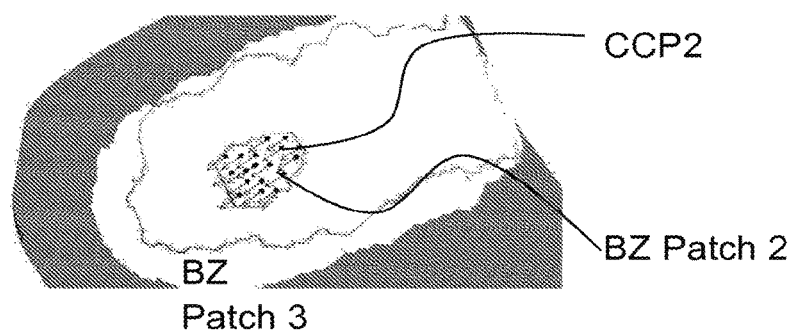
FIGS. 9A and 9B schematically show how to obtain Candidate Channel Region 1 (CCR1), according to step d) of the method of the invention, where the CCP of Surface 50% have been projected on Surface at 44% at step d.2), where.
Figure 9B:
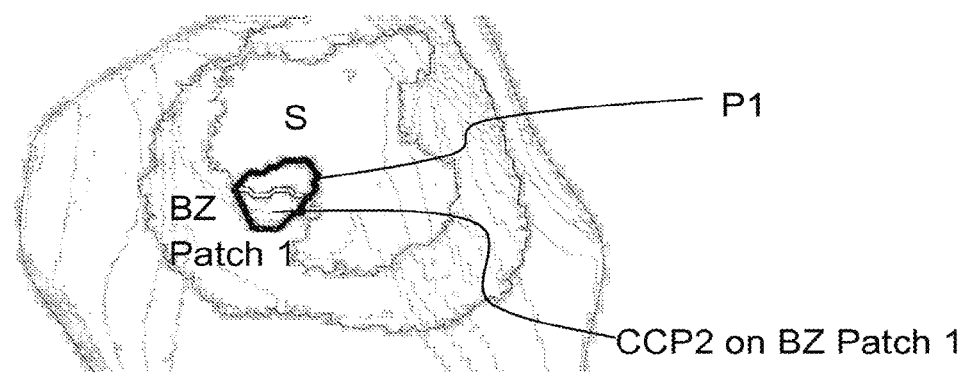
Figure 10A:
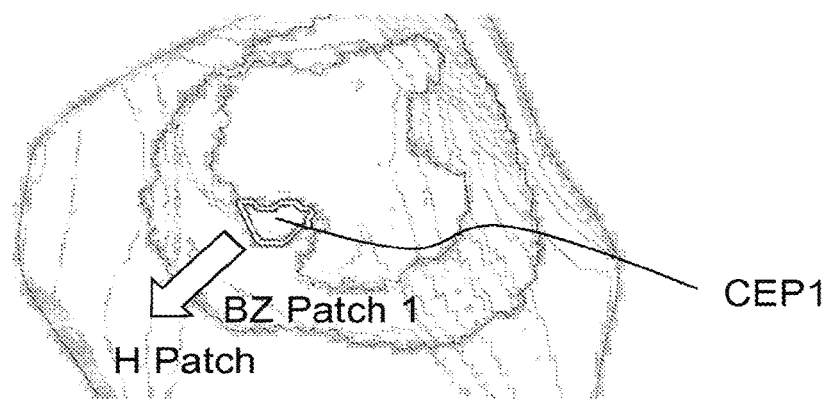
FIGS. 10A and 10B show, as part of the detection of channel in multiple surfaces of FIGS. 8A-8C and FIGS. 9A-9B, to obtain CCR1, where.
Figure 10B:
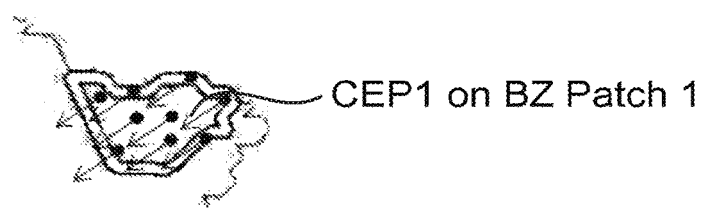
Figure 11A:
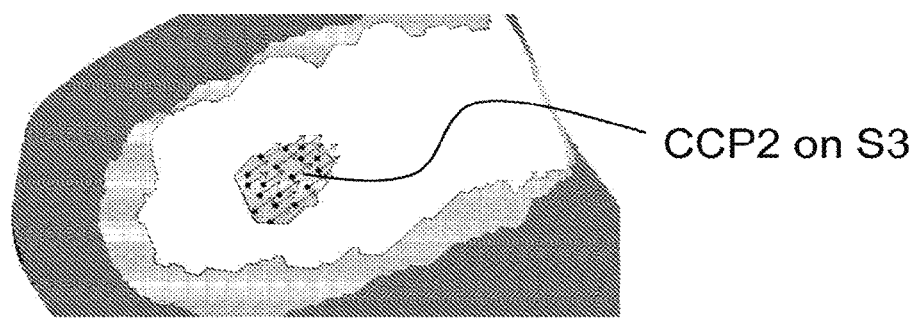
FIG. 11A shows the Surface at 50% (a) and FIG. 11B shows the Surface at 55% (b), for the computation of Candidate Channel Region 2 (CCR2), where CCP2 are projected towards Surface at 55%, also called S3, and where
Figure 11B:
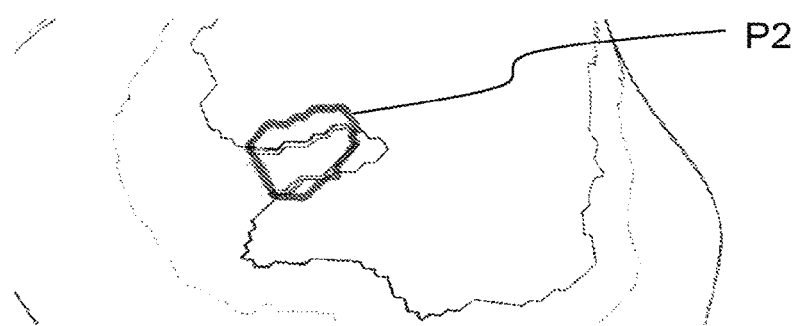
Figure 12A:
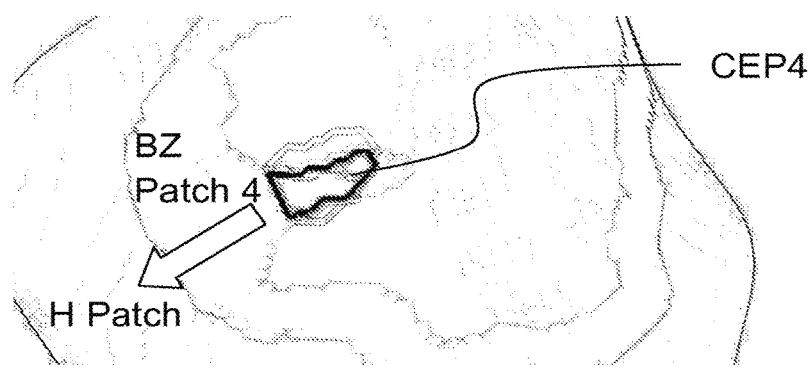
FIGS. 12A and 12B show, as part of the process for obtaining CCR2 of FIGS. 11A and 11B, Surface at 55%.
Figure 12B:
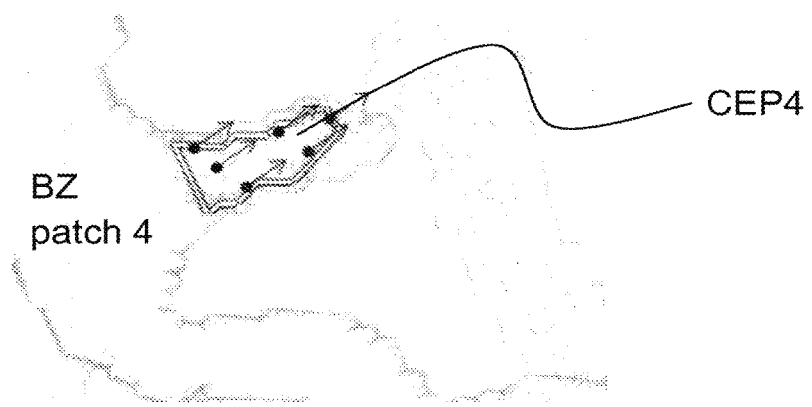
Figure 13:
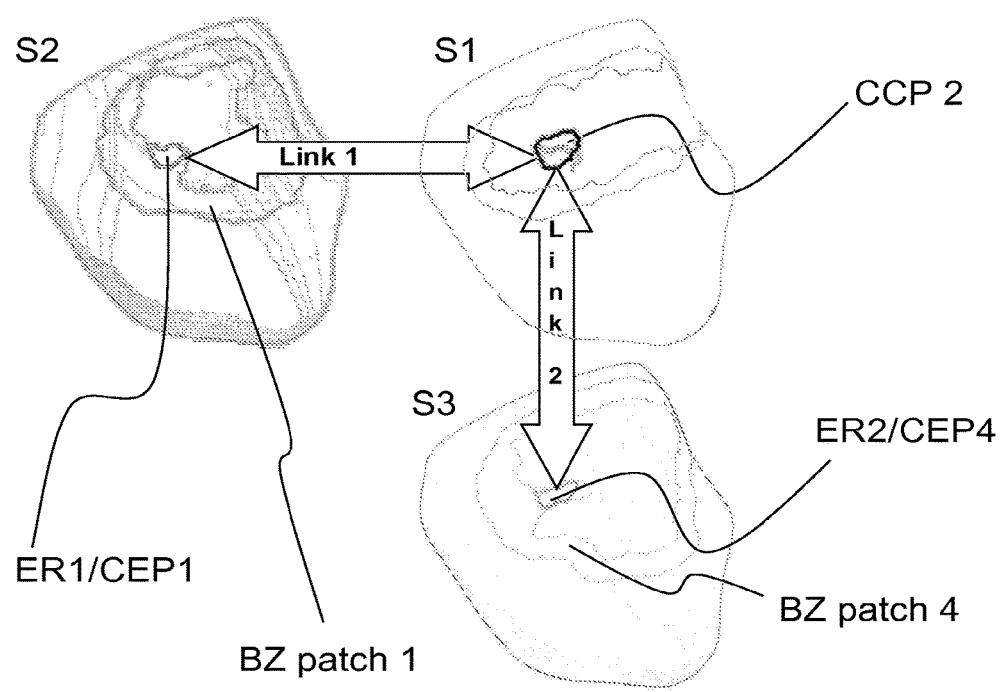
FIG. 13 shows the three surfaces, S1, S2 and S3, with links forming the path from CEP 1 to CEP 4, where Link 1 connects ER1/CEP1 (i.e. Exit Region 1 which contains CEP1) to CCP 2, and Link 2 connects ER2/CEP4 (i.e. Exit Region 2 which contains CEP 4) to CCP 2. This forms a Channel Region that starts at CEP 1 continues on CCP 2 and ends at CEP 4.
Figure 14:
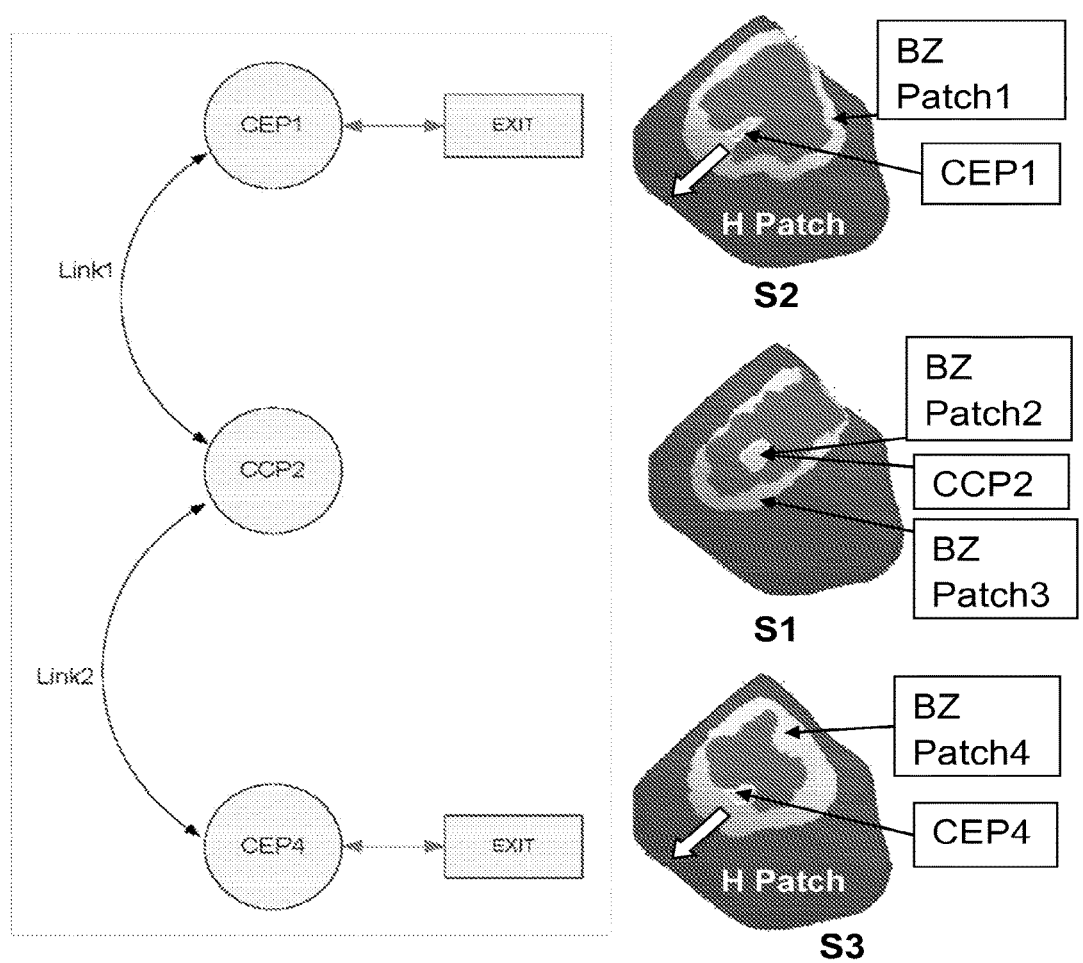
FIG. 14 schematically shows the verifying of the existence of a path connecting two CEPs, for the embodiment of FIG. 13.
Figure 15:
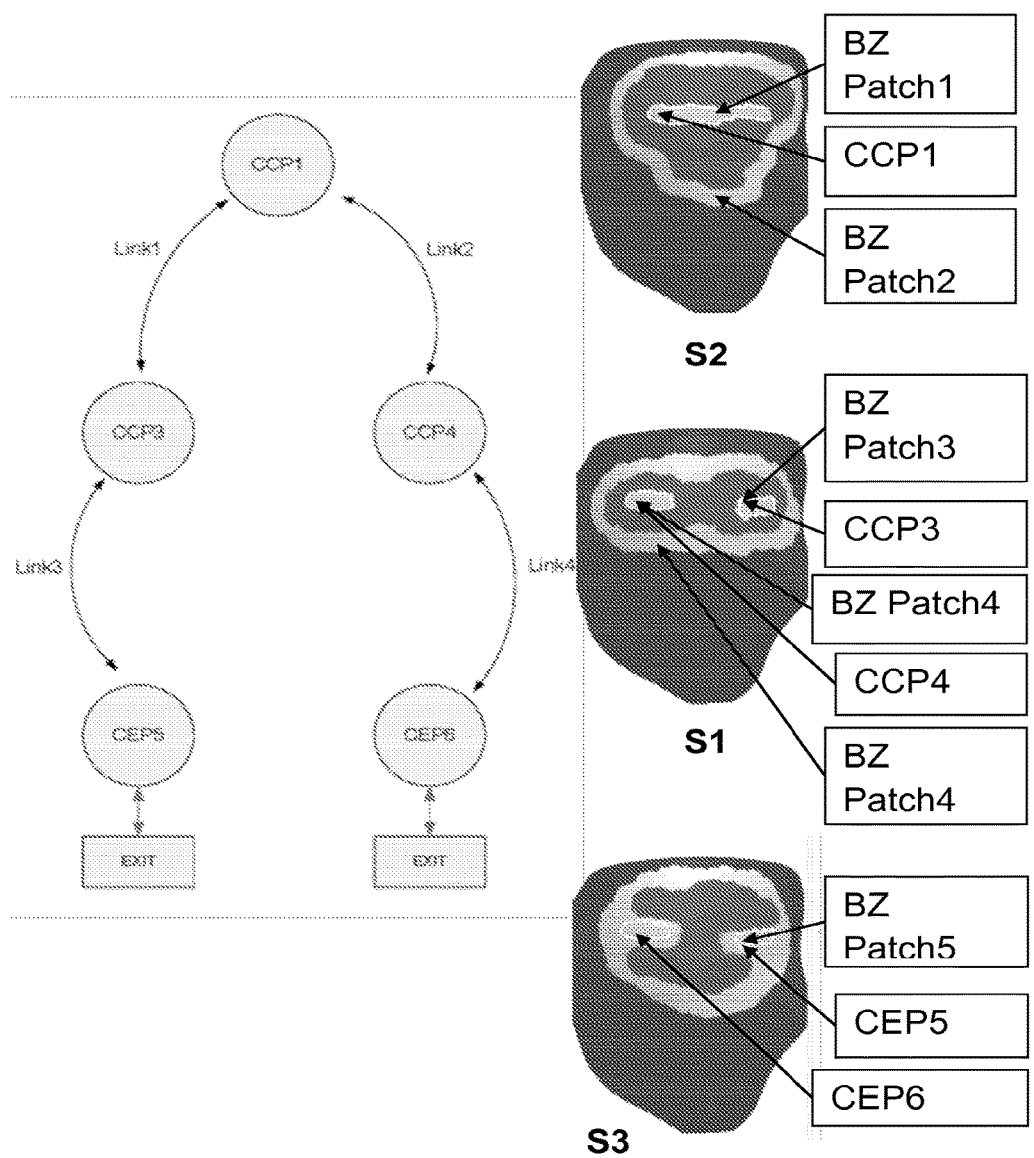
FIG. 15 schematically shows the forming of a Candidate Channel Region, for a different embodiment to that of FIG. 14, where there are more than two links, particularly in a number of four.
Figure 16:
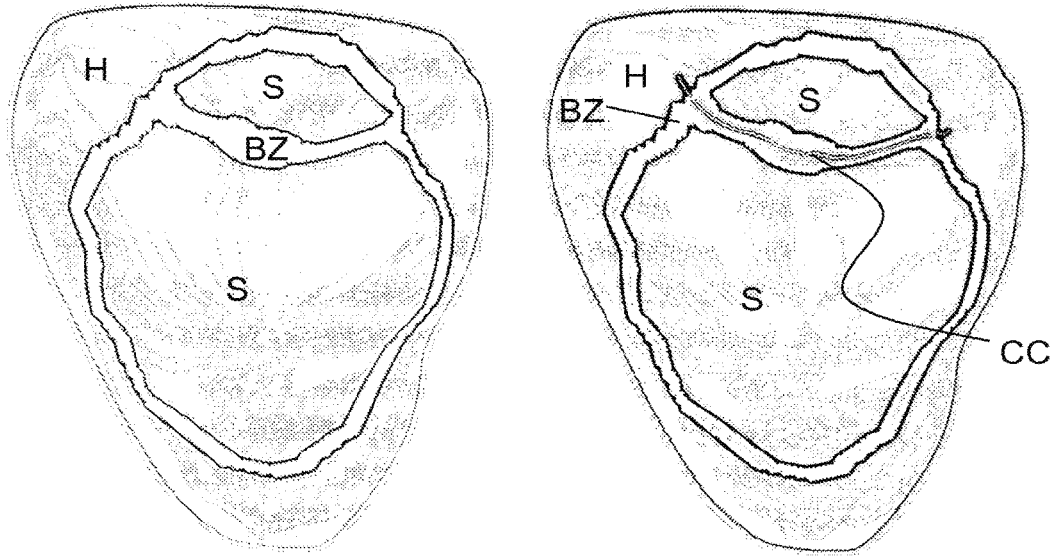
FIG. 16 schematically shows the results obtained from the implementation of the method on a Single Layer, using as input synthetic data, from the embodiment of FIG. 5, where one channel is detected (CC).
Figure 17:
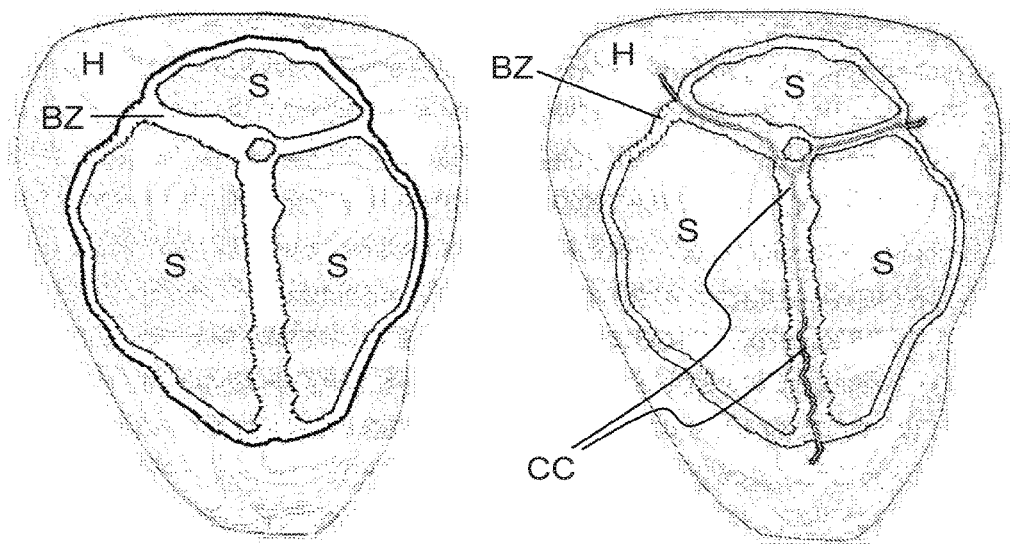
FIG. 17 is analogous to FIG. 16, but for another embodiment showing the results obtained from the implementation of the method on a Single Layer using as input synthetic data, for one defined surface or layer where the BZ patch has two bifurcations. The implementation correctly detects a channel that bifurcates (CC).
Figure 18:
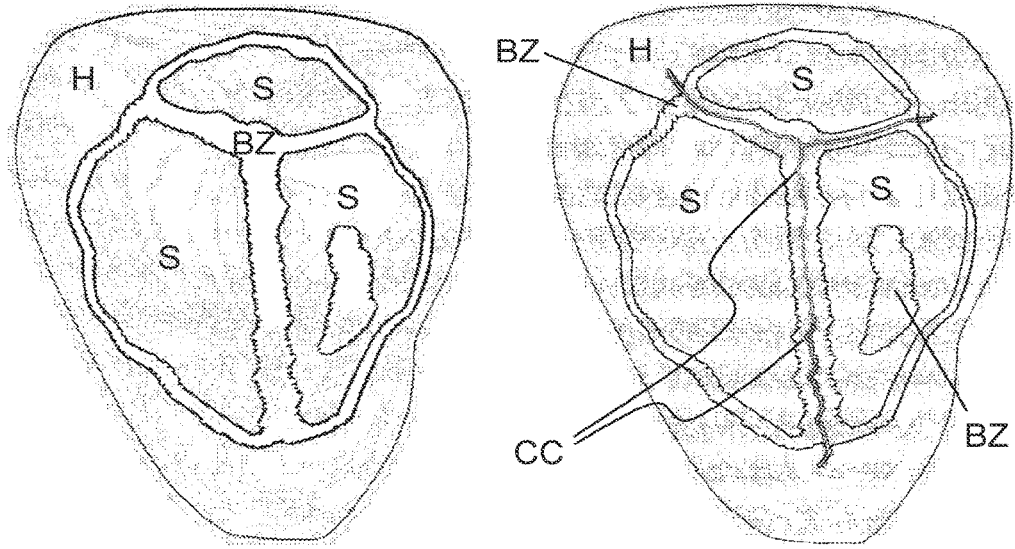
FIG. 18 also shows the results obtained from the implementation of the method on a Single Layer using as input synthetic data, also, as in FIG. 17, for one layer with two bifurcations, but for an embodiment for which, differently to FIG. 17, the defined surface doesn't have a small scar patch in the path of the channel but has a BZ within one of the scar patches. The implementation correctly detects a channel CC that bifurcates.
Figure 19:
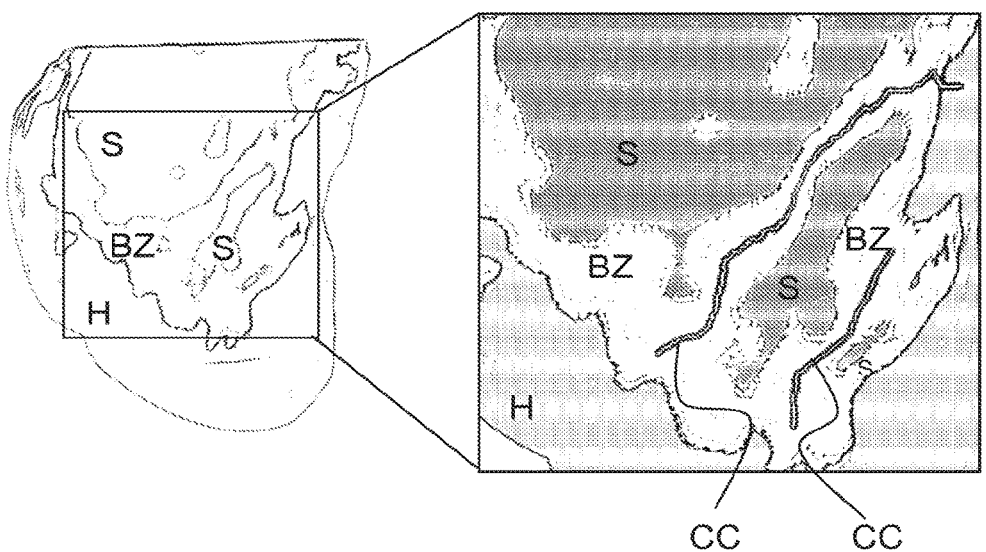
FIG. 19 shows a further embodiment of the Single Layer approach of the method of the invention, i.e. to the one performed according to step c), in the form of the results obtain from the implementation of the method using as input data from a real patient. Two channels CC are detected within the right window.

Given the endo and epi surfaces, the next step is to obtain surfaces (which can be concentric) lying within the volume contained between the endo and epicardium surface boundaries (see FIG. 3). See [2].

I.3 Generate H, BZ and S Patches on the Internal Surfaces.

Next, it is necessary to obtain patches within these surfaces. The patches are formed from the intersection of the sub-volumes H, BZ, and S with the generated surfaces. These patches are by definition delimited by a perimeter. The patches are classified based on the intensity of the intersected voxels. Similarly to sub-volumes, the patches are classified as healthy tissue patch (H), border zone tissue patch (BZ) and core tissue of the scar patch (S) (see FIG. 4).

For the embodiments shown in the Figures, the thresholds to generate H, BZ and S patches on the internal surfaces at step I.3 chosen to define the different patches (FIG. 1) are based on the signal intensity of the voxels of MRI images. These values are chosen initially to be BZMin=(40% of the maximum value) and BZMax=60%. Given the variability of the MRI scans, these settings could vary.

Step I, including all of its sub-steps I.1, I.2 and I.3, are already known in the state of the art, for example by reference [5] cited in the prior art section above.

II. Detect Channel Regions within the Myocardium.

II.1 Obtain Candidate Channel Regions on Surfaces.

For all S patches, the perimeters are radially and uniformly dilated within the enclosing surface until a maximum dilation MaxDilation is obtained. The perimeter points that intersect the perimeter of an adjacent S patch before reaching the maximum dilation MaxDilation and lie within a BZ patch are Candidate Channel Points (CCP) (see FIG. 5). Adjacent CCPs form a Candidate Channel Region (CCRs, see FIG. 6 and FIG. 7).

This process is repeated for all surfaces interpolated in the myocardium to obtain all CCRs that lie within surfaces. The following process is needed to detect CCRs that do not lie completely within a surface.

Regarding the illustrated embodiments, in order to perform step II.1 with the available test data the number of dilation iterations has been set to 7. This number could be changed based on the number of points of the surface (resolution) and/or on the dimension of the channels that we want to detect. A higher number of iterations would allow detecting larger channels. The number of iterations needed to detect a channel on a surface with higher resolution is higher than that needed to detect the same channel on a surface with lower resolution.

II.2 Obtain Candidate Channel Regions Across Surfaces.

This part of the method processes all interpolated surfaces in the myocardium at the same time, in order to find all channels that run through two or more surfaces. Say there are three layers of the myocardium at 44, 50 and 55% of the endocardium wall (see FIG. 8). For each BZ patch in a layer, say BZ Patch 2 in Surface Layer 50% (see FIG. 9), if its perimeter is completely surrounded by an S patch, a representative number of points of the BZ Patch 2 are classified as Candidate Channel Points (for instance the CCP 1 of BZ Patch 2), where said representative number of points corresponds to a minimum subset of all the points that define the surface, chosen to capture the geometry of the surface so that when projected to other adjacent surfaces allows establishing if there is a connection to form a conducting channel.

For each BZ patch containing CCP, these are projected orthogonally from the surface layer (50%) towards the adjacent layers (in this case, the 44% and 55% surfaces) to check for intersections as follows.

The intersection points of the CCP orthogonal projections with the adjacent layers are checked to see if they fall within a BZ Patch, and, if so, they are checked to see if they correspond to CCP on the adjacent layer. If they correspond to CCP, the two CCPs are classified as linked. If they do not correspond to CCP (meaning that the perimeter of the BZ Patch on the adjacent layer is in contact with at least a H patch), say BZ Patch 1 on Surface Layer 44% (FIG. 9 and FIG. 10) or BZ Patch 4 on Surface Layer 55% (FIG. 11 and FIG. 12), they are classified as Candidate Exit Points (CEP) and the CCP and CEP are classified as linked.

If the intersection points fall within an H Patch, it means that the CCP is in contact with an H Patch and needs to be re-classified as CEP.

Say BZ Patch 2 projecting on Surface Layer 1. In the example, CCP 2 intersects BZ Patch 1 to produce CEP 1 of BZ Patch 1. This means that CEP 1 and CCP 2 are connected (we refer to it as a Link 1 see FIG. 13). The same is done projecting to Surface at 55% to obtain Link 2 and the corresponding CEP 4 on BZ Patch 4.

To obtain a Candidate Channel Region across surfaces there must be a path through the Links connecting two CEPs, and containing at least one CCP.

To verify the existence of a path connecting two CEPs, one or more graphs are built with the vertices being the CCPs and CEPs and the edges being the links. In the example in FIG. 14, Graph 1 has three vertices, given by CEP1, CCP2, CEP4, and two edges given by Link1 and Link2.

In mathematics, a graph is an abstract representation of a set of objects where pairs of the objects are connected by links. The interconnected objects are represented by a mathematical abstraction called vertices, and the links that connect pairs of vertices are called edges.

All graphs are analyzed to check the presence of at least two CEPs and for all pairs of CEPs the presence of a path is checked. For graph analysis a graph search algorithm can be used, such as for example the Dijkstra single-source shortest path algorithm [15].

If a path is found, all CCPs and CEPs contained in the path form a Candidate Channel Region. A Candidate Channel Region remains 'candidate' until it is checked or validated (visually or otherwise) by the clinician to filter out those that do not satisfy certain clinical criteria. If the criteria are satisfied, the Candidate Channel Region becomes a Channel Region, that is, a Channel. In the example in FIG. 15, the Path is composed by CEP1, CCP2 and CEP4, which therefore form a Candidate Channel Region.

Figure 20:
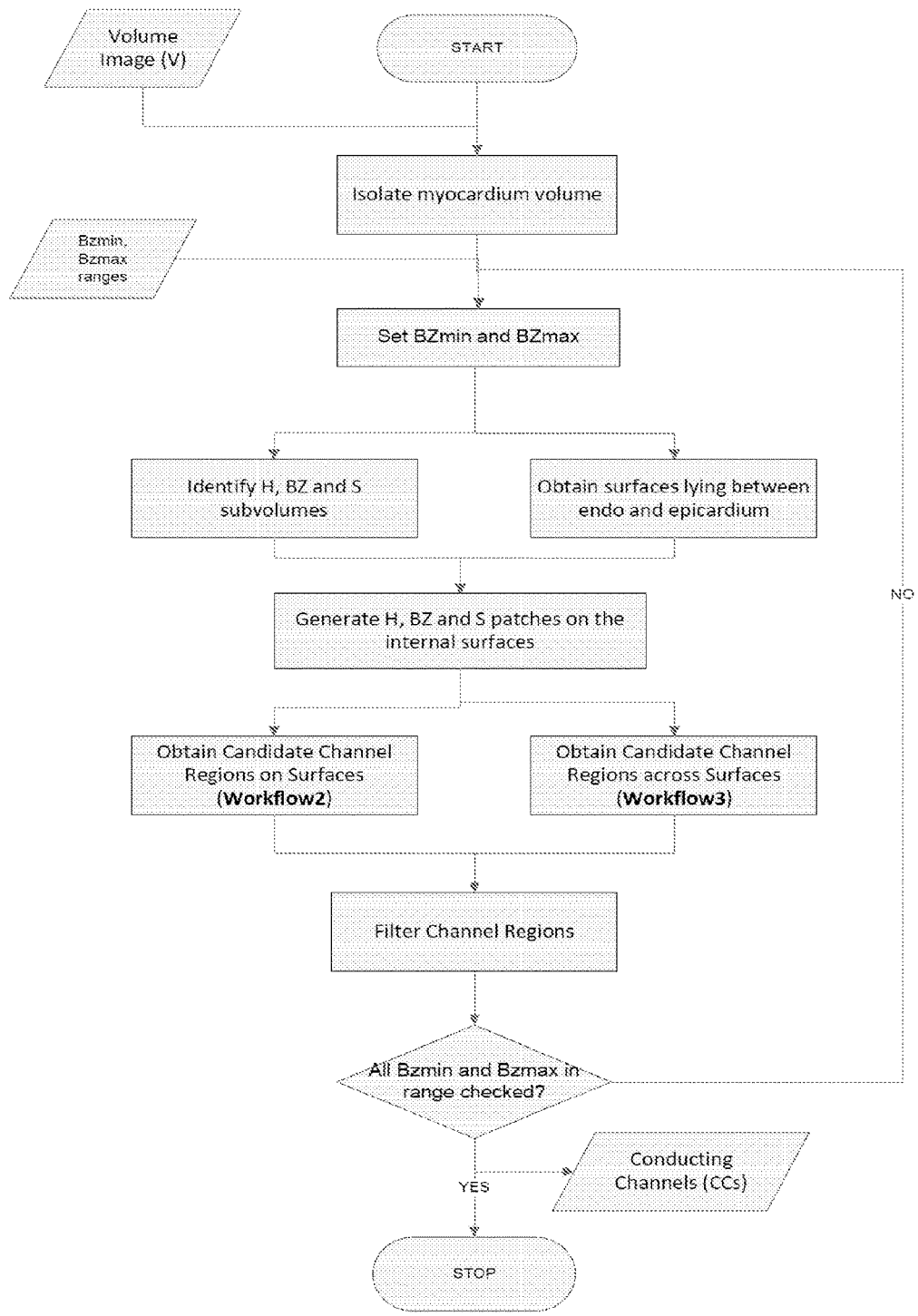
FIG. 20 is a flowchart of the method of the invention, for a general embodiment which combines two workflows, indicated as workflow 2 and workflow 3, which respectively implement step c) and step d) of the method of the invention.

FIG. 20 is a flowchart of the method of the invention, for a general embodiment which includes stages which perform the above mentioned steps I.1, I.2, I.3, II.1, II.2 and II.3, i.e.:

Isolating myocardium volume from a volume image (V).
Setting BZmin and BZmax, based on voxel signal intensity, from corresponding BZmin and BZmax ranges.
Identifying H, BZ and S subvolumes, at the end of step a);
Obtaining surfaces lying between endo and epicardium, at step b.1).
Generating H, BZ and S patches on the internal surfaces, at step b.2).
Obtain Candidate Channel Regions on Surfaces, according to Workflow 2 of FIG. 21, corresponding to step c).
Obtain Candidate Channel Regions across Surfaces, according to Workflow 3 of FIGS. 22A-22B, corresponding to step d).
Filter the obtained Candidate Channel Regions, preferably automatically.
Verify if all BZmin and BZmax in range have been checked:
If not, set BZmin and BZmax again and perform the subsequent steps.
If they have been checked, based on voxel signal intensity, from corresponding BZmin and BZmax ranges, consider the candidate channel regions obtained after the filtering as corresponding to detected CCs.

Figure 21:
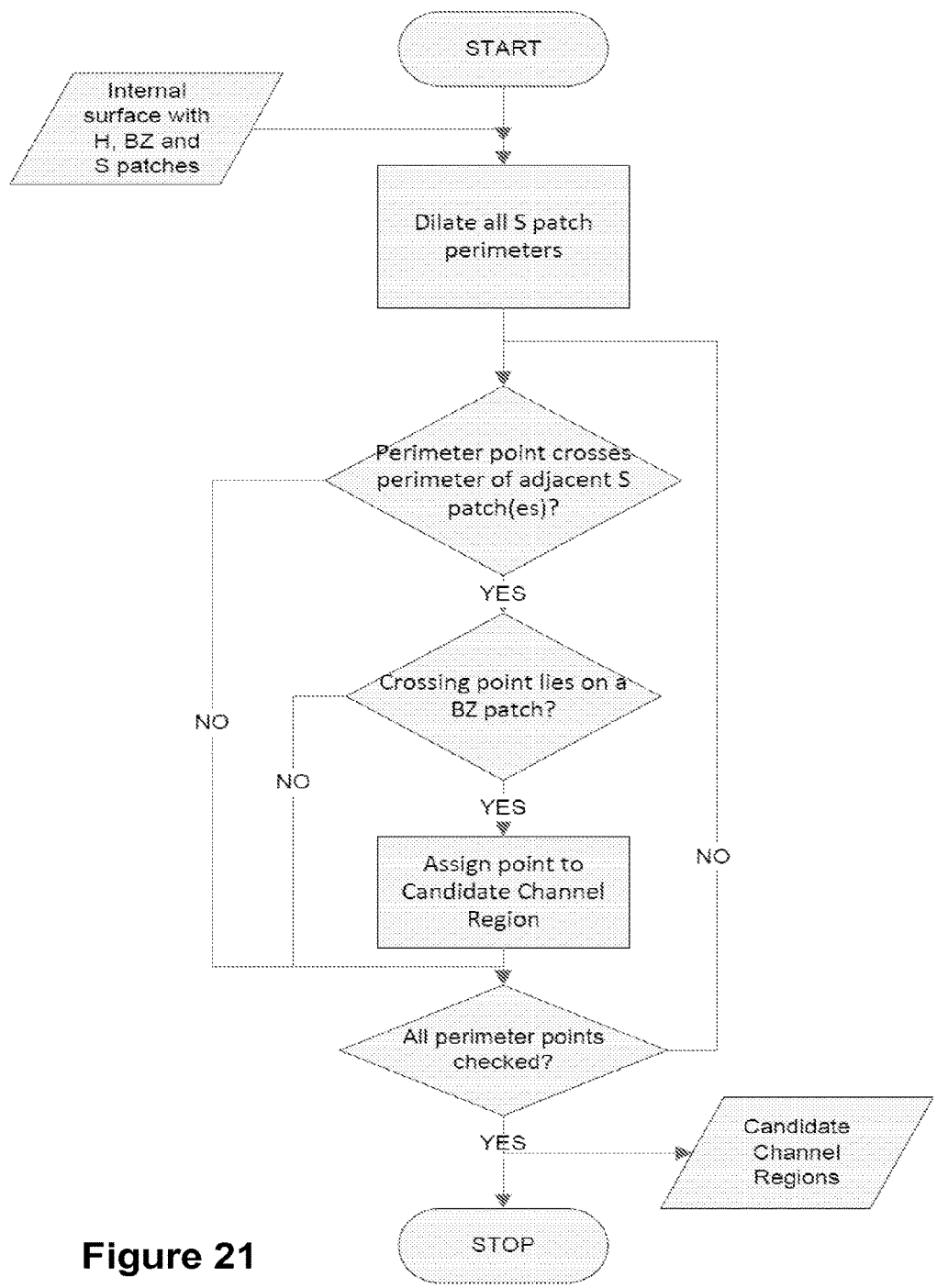
FIG. 21 shows in detail the referred workflow 2, for obtaining Candidate Channel Regions on single surfaces, i.e. to perform step c) for an embodiment.

Regarding Workflow 2, this is depicted in FIG. 21, and relates to the step c) of the method of the invention, i.e. to the bi-dimensional automatic identification of CCs, which is performed in single surfaces. Workflow 2 includes:

Dilating all S patches perimeters of each single surface, at step c.1).
Verify if the dilated perimeter points of a S patch cross the dilated perimeter of an adjacent S patch or patches. If not, go the below step where all perimeter points are checked.
If the just above verification offers a positive response, the crossing points are considered as CCPs, at step c.2), and it is verified if the CCPs lie on a BZ patch. If not, go the below step where all perimeter points are checked.
If the just above verification offers a positive response, the CCPS lying on a BZ patch are assigned to a Candidate Channel Region (CCR), at step c.3).
Next, it is verified if all perimeter points are checked:
If not, verify again if the not yet verified dilated perimeter points of a S patch cross the dilated perimeter of an adjacent S patch or patches, and perform the subsequent steps.
If they have been checked, all the Candidate Channels Regions have been obtained, and can be filtered at the corresponding step of the flowchart of FIG. 20.

Figure 22A:
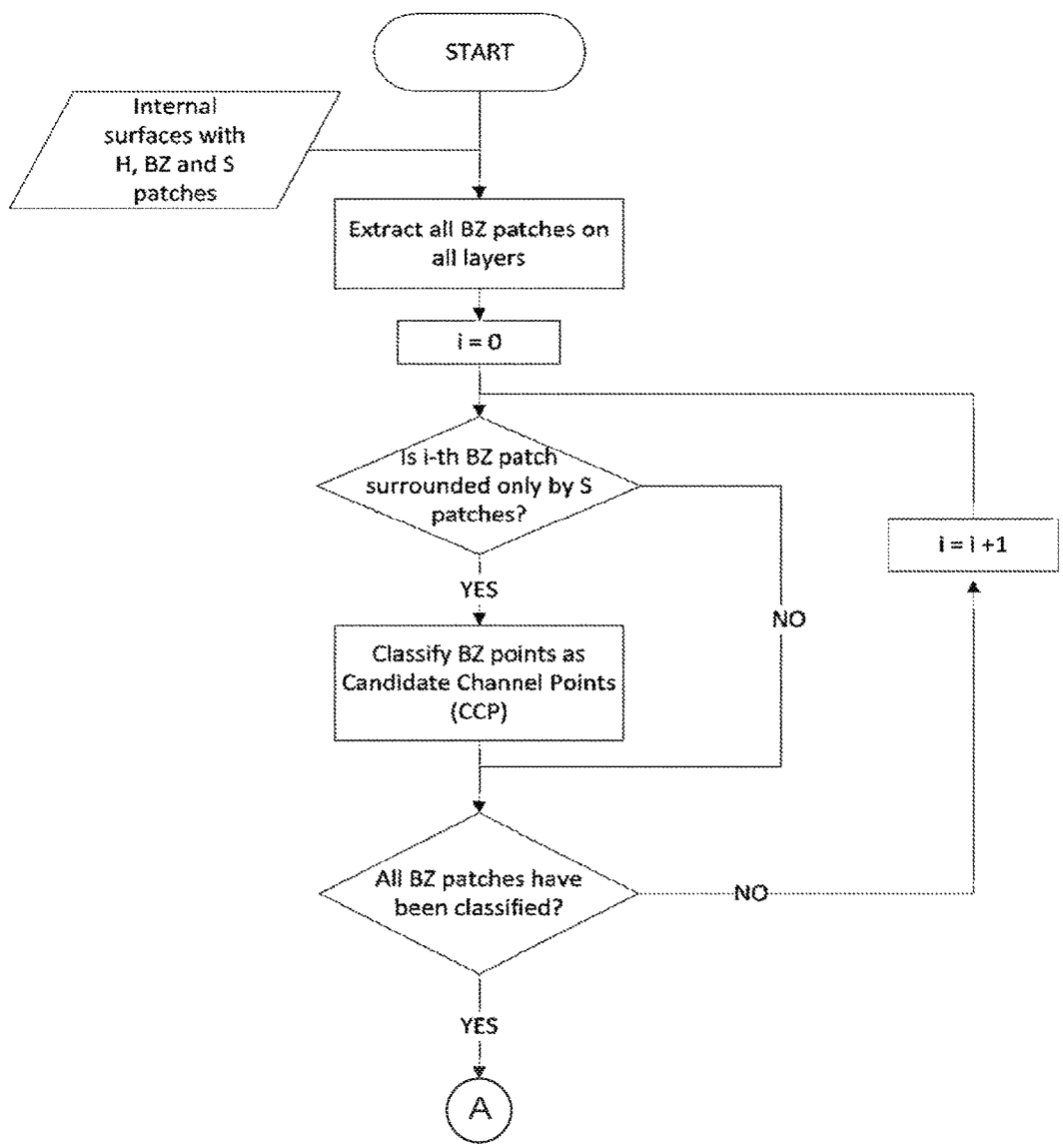
FIGS. 22A and 22B show in detail the referred workflow 3, for obtaining Candidate Channel Regions across Surfaces, i.e. to perform step d) for an embodiment.
Figure 22B:
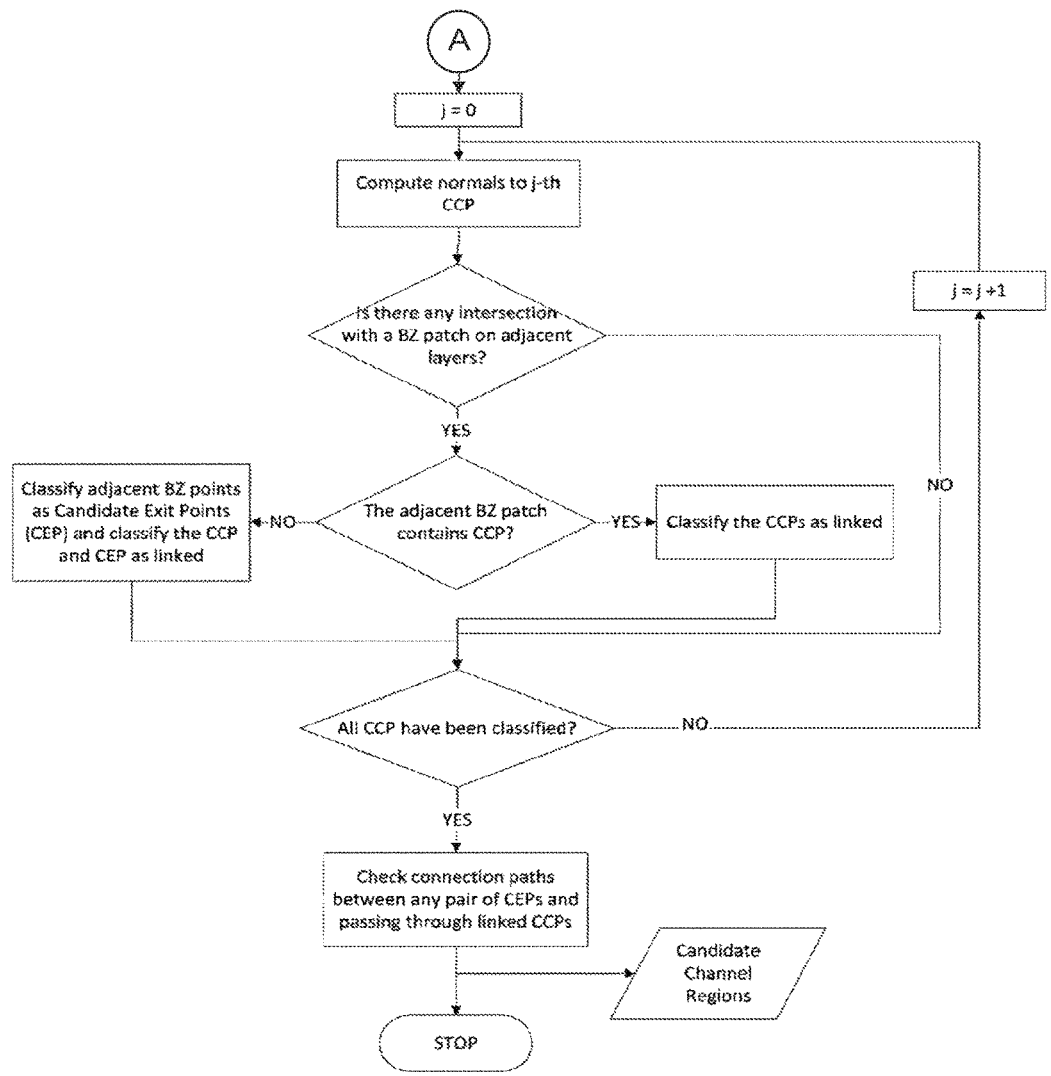

Regarding Workflow 3, this is depicted in FIGS. 22A-22B, and relates to the step d) of the method of the invention, i.e. to the three-dimensional automatic identification of CCs, which is performed across surfaces. Workflow 3 includes:

Extract all BZ patches on all surfaces or layers, and perform the following steps on each surface.
Define a counter i and assign a zero value thereto, i.e. i=0.
Verify if the i-th BZ patch is surrounded only by S patches. If not, go to a subsequent step which verifies if all BZ patches have been classified.
If the just above verification offers a positive response, a classification of the BZ points of said BZ patch as CCPs is performed, at step d.1).
Verify if all BZ patches have been classified. If not, add one to the i counter, i.e. i=i+1.
If the just above verification offers a positive response, define a counter j and assign a zero value thereto, i.e. j=0.
Compute normal to j-th CCP, i.e. perform perpendicular projections on adjacent surfaces, at step d.2).
Verify if there is any intersection with a BZ patch on adjacent layers. If not, go to a posterior step where it is verified if all CCP have been classified.
If the just above verification offers a positive response, it is checked if the adjacent BZ patch contains CCPs. If so, the CCPs of the adjacent layers are classified as linked.

If the just above checking offers a negative response, the adjacent BZ points are classified as CEPs and the CCPs of one layer and CEPs of the adjacent layer are linked.

It is verified if all CCPs have been classified. If not, add one to the j counter, i.e. j=j+1.

If the just above verification offers a positive result, the connection paths between any pair of CEPs and passing through linked CCPs are checked.

Each of said checked connection paths is considered as a CCR, at step d.3), and can be filtered at the corresponding step of the flowchart of FIG. 20.

The present inventors have implemented a working prototype for the preferred embodiment of the invention, in the form of a computer program which implements the method of the inventions. The implementation takes a CE-MRI data set, loads it into memory and proceeds to segment it to identify the endocardium and epicardium. It then automatically interpolates the layers. It then maps the values the voxels of the original volume to the surfaces. These mapped layers provide the starting point for the software implementation, which then proceeds as follows.

1. Single layer processing
2. Multiple layer processing
3. Merge of results from Single and Multiple layers
4. Output of results Once the method outputs the results, further processing can be activated to filter the detected channels removing those channels that do not fulfil certain clinical requirements that would be expected on real conducting channels in the myocardium. After that, an interface would be needed to allow the manual removal by an EP of any false positives that may have not been successfully filtered. An automatic performing of said removal is preferred.

Volume Approach:

FIGS. 23A to 25F show different embodiments of the method of the first and second aspects of the invention, implementing a volume approach.

Figure 23A:
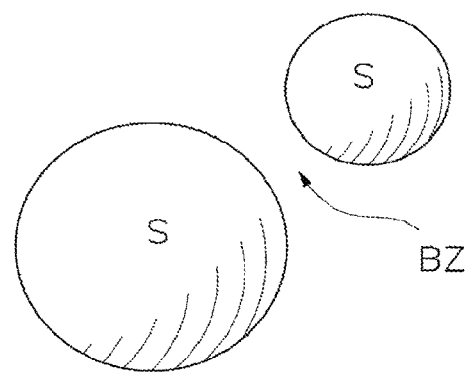
FIGS. 23A and 23B schematically show two adjacent well-defined zone (S) volume patches, where view FIG. 23A corresponds to an initial state and view FIG. 23B to a state where, according to an embodiment of the method of the present invention intended to identify a channel running between both volume patches, the well-defined volume patches (S) have been submitted to a 3D dilation until some points of their external perimeters intersect with each other defining candidate channel points (CCP).
Figure 23B:
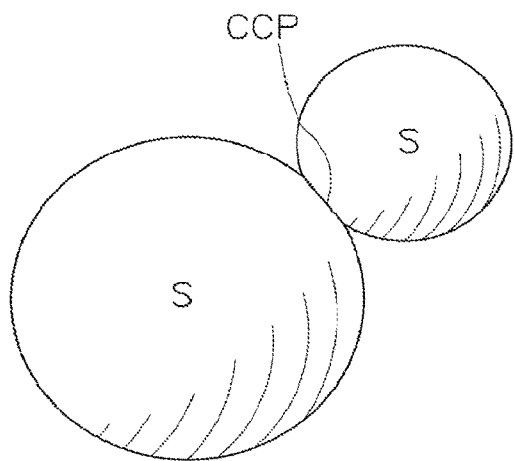

The embodiment of FIGS. 23A and 23B, particularly shows two adjacent well-defined zone volume patches S having a spherical shape and, at their initial position at view a), being separated (and surrounded) by a not-well defined zone volume patch BZ. Both S volume patches are submitted to dilation until some points of their external perimeters intersect with each other, as shown in view b), defining candidate channel points CCP which, as described in a previous section, will define candidate channel regions CCR, where said regions constitute volumes. In this case the CCR is a junction volume between both S volume patches, constituting a potential channel volume.

Apart from said junction volumes, channels can be defined by other kind of elements, particularly by holes traversing a S volume patch, as is the case of the embodiments shown in FIGS. 24A-24F and 25A-25F, which differ with each other only in the shape of the S volume patch: spherical in FIG. 24 and cubic in FIG. 25. These two shapes are only examples of possible shapes of the patches, as any kind of volume shape can be used according to the volume approach of the method of the present invention.

Although not shown, for clarity sake, the S volume patches of FIGS. 24 and 25 are surrounded by BZ volume patches, thus the through hole O is filled with part of said BZ volume patches, as indicated in views a).

As shown in FIGS. 24 and 25, the S volume patch having a through hole O at its initial state (view a)) is submitted to some dilation steps (views b) and c)), in this case in a number of two, which makes the external perimeter of the S volume patches bigger and the perimeter of the hole O smaller, until the hole O disappear in view c).

From this point, the S volume patch is submitted to erosion steps (e) and f)), with the same degree than the dilation steps, as a result of which the external perimeter of the S volume patch returns to its original size and shape, as can be seen by comparing views a) and f).

Figure 24A:
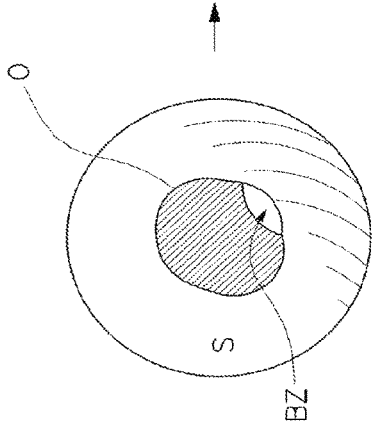
FIGS. 24A, 24B and 24C schematically show a spherical shaped well-defined zone (S) volume patch having a through hole (O) at an initial state (FIG. 24A), and being submitted first to a succession of dilation steps (FIG. 24B and FIG. 24C), and then to a succession of erosion steps (FIGS. 24D, 24E and 24F), according to another embodiment of the method of the present invention intended to identify the channel constituted by said through hole (O).
Figure 24B:
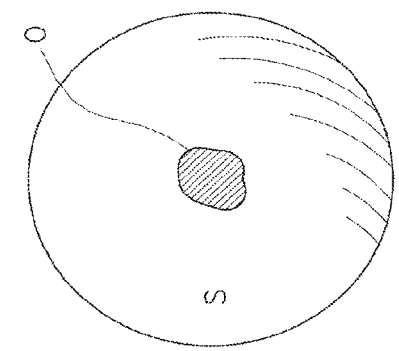
Figure 24C:
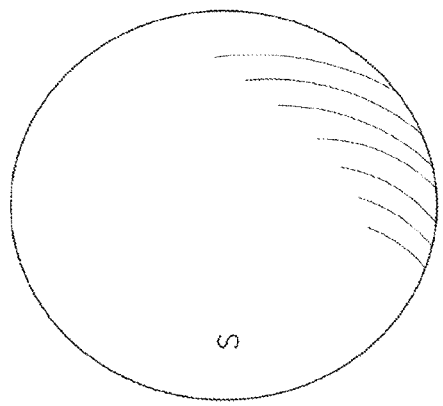
Figure 24D:
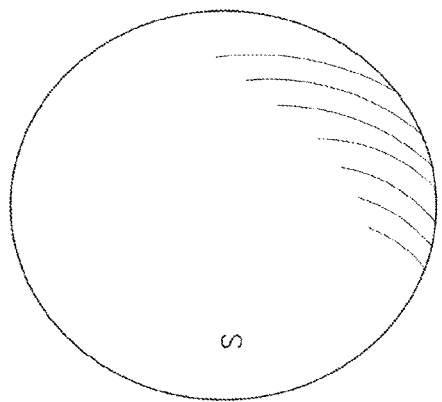
Figure 24E:
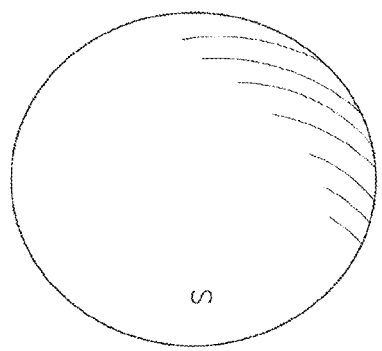
Figure 24F:
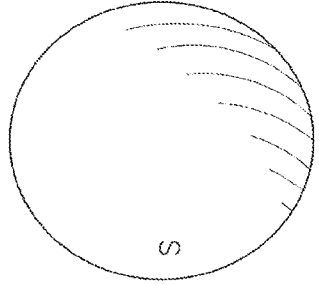
Figure 25C:
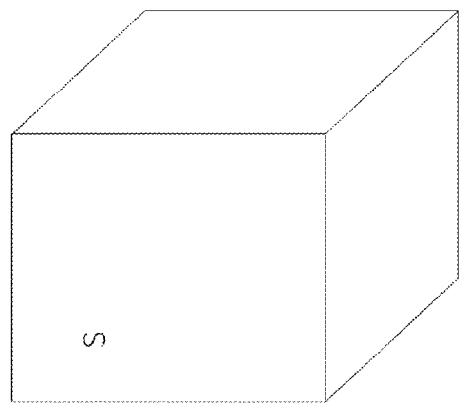
FIGS. 25A-25F are analogous to FIGS. 24A-24E, but for a well-defined zone (S) volume patch having a cubic shape.
Figure 25D:
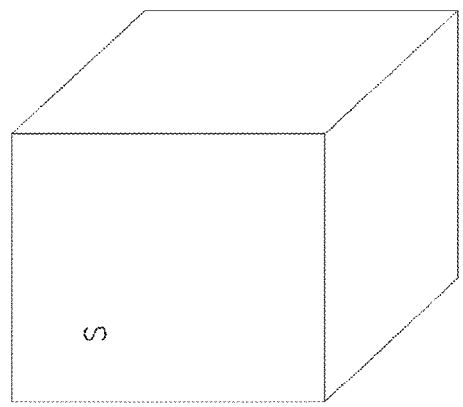
Figure 25B:
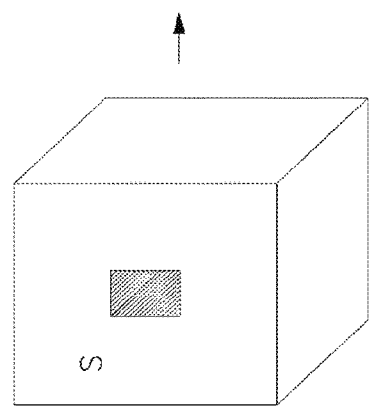
Figure 25E:
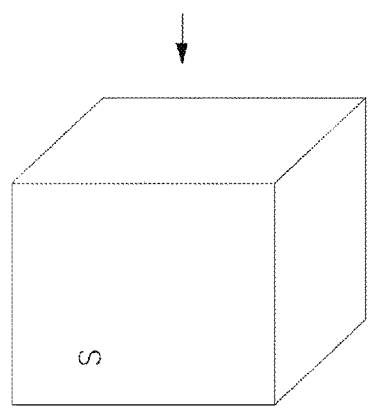
Figure 25A:
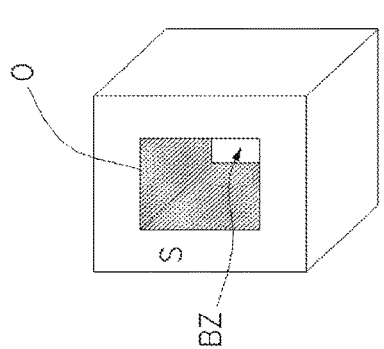
Figure 25F:
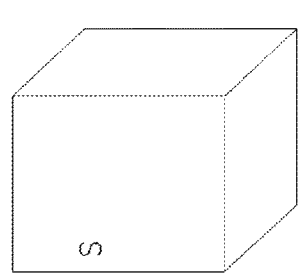

Due to the fact that, as a result of the dilation steps, the hole O has disappeared, that feature is not recovered through the erosion steps, and thus FIGS. 24F and 25F show the S volume patches without any hole. Therefore, by comparing view a) with view f), according to the method of the present invention, the through hole O can be detected from the differences between said views.

In this case, erosion steps are used as a mechanism for detecting the through hole O, and can be omitted for other embodiments which use alternative mechanisms to provide such detection which allow, before the dilation process is started, the identification of different parts of each S volume patch with respect to the through hole or cavity demarcated thereby.

Although for the embodiment of FIGS. 23A to 23B erosion is not needed, it can be used as a mechanism for detecting the intersecting points CCPs, and finally the CCR, as those points will make that the S volume patches resulting from the erosion steps will be different from the ones of view a). For alternative mechanisms for detecting said CCPs when using only dilation, each S volume patch must be identified and labeled before the dilation process.

A more specific implementation of the volume approach of the method of the present invention is performed as follows, for the identification of myocardium CC channels:

1. Generate Healthy (H), Border Zone (BZ) and Scar (S) Tissue Patches within the Myocardium Volume.

1.1. Isolate myocardium volume and classify sub-volumes. It starts by recognizing the endocardial and epicardial walls in the volumetric dataset, to obtain a subset of voxels that represents the myocardium. Within the epicardial and the endocardial walls a number of sub-volumes are identified, which can be classified as healthy tissue (H), border zone tissue (BZ) and core tissue of the scar (S). The BZ tissue has a range of intensities that go from those of H to those of S. The sub-volumes are classified based on two thresholds of voxel intensity signals, MinBZ and MaxBZ. These thresholds can either be predefined or varied for each patient, while maintaining the previously defined enclosing relationship. As a result of this operation, an image volume is generated from the original volumetric dataset in which the voxels belonging to S regions are associated with a unique intensity value (e.g. MaxBz+1).

2. Detect Channel Volumes within the Myocardium

The image volume generated in the previous step is subject to a dilation followed by erosion, with respect to S voxels, for a fixed number of iterations. For each iteration, the original volume (before the dilation and erosion) and the resulting volume (after the dilation and erosion) are compared. When a difference between the two volumes is detected, the voxels resulting from the difference between the two volumes and belonging to BZ are classified as voxels of a candidate hole volume. At the end of the iterative process, the candidate hole volume (CHT) is divided in different connected candidate hole sub-volumes (CHi with i=1 . . . n and n=number of connected sub-volumes in CHT). Each CHi is then checked to verify if it has entrance and exit zones: the CHi voxels that are in contact with H voxels are classified as border voxels. Such border voxels are then grouped in order to form connected border volumes. If CHi contains at least two distinct border volumes, its voxels are marked as potential channel voxels. Connected potential channel voxels build a potential channel volume.

3. Filter Channel Volumes 3.1. Then, when all the potential channel volumes are identified, it filters out those volumes that do not qualify as arrhythmia generating channels, based on certain geometrical and topological criteria, such as the ratio between the distance between the entrance and exit volumes and the shortest path around the adjacent S sub-volumes and across an H sub-volume that generate the channel.

3.2. The remaining potential channel volumes are marked as channels.

Figure 26:
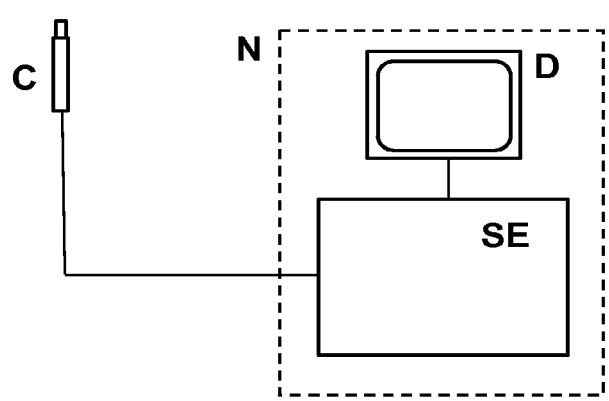
FIG. 26 schematically shows the EAM system of the fourth aspect of the present invention, for an embodiment.

Finally, the EAM system of the fourth aspect of the present invention is schematically shown in FIG. 26, for an embodiment, for which the EAM system comprises:

a catheter C having at least one electrode for acquiring values of an electrical parameter (such as voltage) and/or of a parameter associated thereto, at different points of at least an endocardium and/or epicardium when travelling there through; and computing navigation means N in communication with said catheter C and comprising a display D and an electronic system SE which, among others, comprises:
locating means configured for collaborating with said catheter C to locate its positions along said travelling through the endocardium and/or epicardium; and
reading means configured for collaborating with said catheter C to read the values acquired thereby.

The computing navigation means N are configured and arranged for accessing said read values and located catheter positions, correlate them and build and store in memory means an EAM 3D volume therewith, and for implementing the method of the first aspect of the invention for the EAM polygonal mesh embodiment (referred in a previous section as second preferred embodiment) for identifying myocardium conducting channels on the EAM 3D polygonal mesh retrieved thereby at sub-step b.1), and for displaying on the display at least the candidate channel regions CCR identified at sub-step c.3).

Apart from the preferred embodiment described above with reference to the appended Figures, as stated in a previous section, the method of the invention has many other applications, according to different embodiments. In principle, any industry that relies on volumetric 3D imaging acquisition to obtain 3D data, and that it then needs to process it to find channels inside them, could be a candidate target for this method.

Medical or Veterinary Applications:

One of said further applications relates to screening. The above described preferred embodiment or application of the invention to reveals scar from DE-MRI (or other imaging means) and compute conducting channels to plan the treatment of already infracted patients can be broaden to identifying arrhythmic patients before any symptoms are developed. This would represent a Screening of the general population, or just the population at risk, and could prevent Sudden Cardiac Death (SCD) by providing a "risk stratification" protocol to be carried out by Public Health administrations worldwide.

Neurology:

In Neurology, the brain is imaged for a variety of reasons, among them to identify tumour activity, or the damage after stroke, or to determine the epileptogenic focus.

Brain Tumours:

When tumour tissue grows it can create trapped channels of viable tissue inside it (or if more than one focus of tumour grows, the tumours can create channels between themselves). This trapped viable tissue can form channels made of connecting tracts that could have vital functionality. If a surgeon is planning the intervention, it is critical to decide whether to resect the tumour or not, and if so, how aggressively to do it. If the tumour contains channels of life critical tracts inside it, it may be advisable not to resect it, or to resect it less aggressively. In this example, which shows an MRI scan after an injection of contrast media, the tumour tissue (the S) appears as brighter grey, having taken up contrast. The tissue surrounding the tumour that traps inside viable tissue would be the BZ. And H would be the skull surrounding the parenchyma. The method could be used to work on the tumour boundary only (to detect channels running within undefined tissue trapped between tumour tissue that could help surgeons in deciding a resection strategy. It is very important to identify such a viable tissue between tumour, particularly when it is responsible for performing an important function of the brain, therefore its automatic identification can prevent its removing when removing the tumours surrounding it.

Brain Stroke:

Similarly to the case of the myocardium, the brain can suffer from lack of blood supply to produce stroke. Brain that have infracted tissue with less blood supply could be one kind of tissue (S), and be differentiated from those not-well-defined areas (BZ), which will be encase within the skull (H). Then this method can be helpful to detect corridors between infracted tissue that could serve to indicate the viability of a future blood supply and thus the potential for recovery of the patient.

Liver, Lungs:

Also similarly in the liver, in areas of poor functionality for lack of blood supply or affected by cirrhosis, it could be possible to identify three regions and detect channels between them to help with decision support on transplant volume.

Geophysical Exploration:

Oil, water and gas trapped on the crust of the Earth can benefit from the method of the invention when applied to predict the channels of escape or leak. Geophysical exploration uses seismic data from ultrasound acquisitions (among other technologies) to image the Earth in order to detect or infer the presence and position of ore minerals, hydrocarbons, geothermal reservoirs, groundwater reservoirs, and other geological structures. The Energy industry has several main companies that sell products to analyse volumetric seismic data: Landmark Graphics (Haliburton), GeoQuest (a division of Schlumberger) and Paradigm Geophysical.

The resulting data are 3D volumes that can be processed by the current invention to extract automatically channels that could reveal for example an ancient riverbed. Such riverbeds are sand-rich features and can soak up oil, and so are of great interest in oil and gas exploration. As described in a previous section, for this application the first defined zone (H) and second defined zone (S) are, respectively, a zone containing fluid or susceptible of containing fluid and a zone non containing or not susceptible of containing fluid.

Cracks in Manufactured Products:

The manufacturing industry (say, to produce a car or a jet engine, and also to produce circuit printed boards with integrated silicon chips) could benefit from this method to examine the state of a device using 3D acquisitions (for example from high energy CT) of products that may have cracks inside them due to porosity or other material defects.

An engine can be made of several materials, each having different absorption properties under X-Rays. In the simplest case, one could just inspect the metal or plastic part and classify the inspected areas with different shades of grey according to the above mentioned classification of first defined zone (H), second defined zone (S) and not well defined zone (BZ), and apply the method of the invention to automatically detect cracks inside the BZ zone. This could be automated in the manufacturing line, having a high energy CT at the end point, to ensure that products coming out of the factory have no channel-like cracks in their interior, without humans having to look at the volumes resulting from the scan.

Once the different zones H, S and BZ have been defined for all the above embodiments related to the cited applications in different technical fields, the implementation of the method of the present invention is obviously the same than for the above described preferred embodiment related to the identifying of myocardium conductive channels, differing between each other in the kind of element constituting each zone and in the kind of channel to be identified, as is graphically shown in the next table.

| Embodiments | Channel | First defined zone (H) | Second defined zone (S) | Not well defined zone (BZ) |
| --- | --- | --- | --- | --- |
| Preferred embodiment | Myocardium conductive channel | Healthy tissue zone | Scar tissue zone | Border tissue zone |
| Brain Tumour | Tumour channel | Skull surrounding the parenchyma | Tumour tissue zone | Viable tissue zone |
| Brain Stroke | Corridor for blood supply | Skull | Infracted zone | Not-well-defined area |
| Liver, Lungs | Blood supply channel | Healthy tissue zone | Low blood supply zone | Not-well-defined area |
| Geophysical exploration | Oil, water or gas channel | Zone containing fluid or susceptible of containing fluid | Zone non containing or not susceptible of containing fluid | Not-well defined zone |
| Manufacturing industry | Crack | Zone with first absorption properties under X-Rays | Zone with second absorption properties under X-Rays | Zone with third absorption properties under X-Rays |

In other words, for instance for the layered approach, the dilation of the perimeters of S zones and the identifying on the intersecting perimeter points of adjacent S zones of CCPs forming CCRs, is performed in the same manner independently on what said S zones are made of (scar tissue, low blood supply tissue, etc.), i.e. independently of the technical field to which the method is applied.

The rest of steps of the method of the first aspect of the present invention (both for the layered and for the volume approaches) are also valid for, among others, all the embodiments included in the above table, as once the S, H and BZ zones are defined, for the present invention, no matter to which elements they refer.

A person skilled in the art could introduce changes and modifications in the embodiments described without departing from the scope of the invention as it is defined in the attached claims.

The invention claimed is:

1. Computer implemented method for identifying channels in a 3D data volume, said channels being passage-like structures of a 3D object within said 3D data volume, which comprises:
    a) obtaining a 3D volume of the object containing, directly or on a sub-volume isolated therefrom, at least two different data sub-volumes identified based on physical parameter values representative of physical properties of said object, and termed as: zone S and zone BZ;
    b) generating zone S and zone BZ patches from, respectively, said at least two sub-volumes; and
    c) automatically identifying possible channels, in said zone BZ patches, by means of automatically obtaining candidate channels regions, as follows:
        c.1) dilating at least the perimeters of the zone S patches;
        c.2) considering as candidate channel points (CCP) the perimeter points that intersect the perimeter of adjacent zone S patches, and/or the perimeter points that intersect with the same perimeter of the same zone S patch, before reaching a maximum dilation and lie within a zone BZ patch, and
        c.3) determining that adjacent candidate channel points (CCP) form a candidate channel region (CCR),
wherein the method being applicable to a medical or veterinary field in particular for the automatic detection of channels in internal organs.

2. The computer implemented method of claim 1, comprising performing said channels identification using a layered approach, as follows:
    performing said patches generation of step b) by means of:
        b.1) defining a series of layers representing sections of at least part of the 3D volume or of said sub-volume isolated therefrom, said layers being polygonal meshes; and
        b.2) generating patches regarding zone S and zone BZ, from the intersection of the at least two sub-volumes with the layers, defined at b.1), interpolated therein; and
    performing said automatic identification of step c) bi-dimensionally on at least one of the defined layers, where the dilation of said sub-step c.1) is performed regarding the zone S patches included in said at least one of the defined layers, and said sub-step c.2) comprises considering as candidate channel points (CCP) the perimeter points that intersect the perimeter of adjacent zone S patches.

3. The computer implemented method of claim 2, wherein:
    said at least two different sub-volumes are at least three sub-volumes identified, based on voxel intensity values and/or colour values, as: zone H, zone S and zone BZ;
    said step b) comprises generating zone H, zone S and zone BZ patches from, respectively, said at least three sub-volumes; and
    said sub-step b.2) comprises generating patches regarding zone H, zone S and zone BZ, from the intersection of the at least three sub-volumes with the layers, defined at b.1), interpolated therein.

4. The computer implemented method of claim 1, wherein said physical parameter is associated to at least one of absorption or reflection of light, magnetic or electromagnetic radiation, temperature, electricity, signal intensity, signal phase, time, frequency and colour, or a combination thereof.

5. The computer implemented method of claim 1, wherein:
at step a):
said obtaining of said 3D volume comprises obtaining an Electro Anatomical Mapping, EAM, 3D volume from memory means; and
said zone S and zone BZ sub-volumes are identified based on values of an electrical parameter and/or of a parameter associated thereto;
the method comprising:
performing said patches generation of step b) by means of:
b.1) retrieving at least one EAM 3D polygonal mesh from said EAM 3D volume or said sub-volume isolated therefrom; and
b.2) generating patches regarding zone S and zone BZ on respective zones of said at least one EAM 3D polygonal mesh coincident with or constituted by the at least two identified sub-volumes;
and performing said automatic identification of step c) bi-dimensionally on said at least one EAM 3D polygonal mesh, where the dilation of said sub-step c.1) is performed regarding the zone S patches included in said at least one EAM 3D polygonal mesh, and said sub-step c.2) comprises considering as candidate channel points (CCP) the perimeter points that intersect the perimeter of adjacent well-defined zone (S) patches.

6. The method of claim 3, wherein said step c) comprises automatically obtaining candidate channel regions bi-dimensionally on at least two of the defined layers, by means of said steps c.1) to c.3).

7. The method of claim 5, wherein said step c) comprises automatically obtaining candidate channel regions bi-dimensionally on at least two EAM 3D polygonal meshes, by means of said steps c.1) to c.3).

8. The method of claim 3, wherein said dilation of step c.1) is performed radially and uniformly.

9. The method of claim 3, further comprising a step d) for identifying the possible channels by means of automatically obtaining candidate channel regions three-dimensionally across at least two layers of said layers defined at b.1), for finding channels running through different layers.

10. The method of claim 9, comprising performing said step d) as follows:
d.1) for each zone BZ patch in a layer whose perimeter is completely surrounded by a zone S patch, a representative number of points of the zone BZ patch are classified as candidate channel points (CCP);
d.2) for each zone BZ patch containing candidate channel points (CCP), these are projected towards at least two other of said layers to check for intersections, and when they fall on a zone H patch or when they fall on a zone BZ patch which perimeter is at least in part in contact with a zone H patch they are classified as candidate exit points (CEP); and
d.3) candidate channel regions (CCR) are defined as those regarding a path running across layers through links connecting two groups of candidate exit points (CEP), and containing one or more candidate channel points (CCP).

11. The method of claim 5, further comprising a step d) for identifying the possible channels by means of automatically obtaining candidate channel regions three-dimensionally across at least two EAM 3D polygonal meshes retrieved at b.1), for finding channels running through different EAM 3D polygonal meshes.

12. The method of claim 11, comprising performing said step d) as follows:
d.1) for each zone BZ patch in a EAM 3D polygonal mesh whose perimeter is completely surrounded by a zone S patch, a representative number of points of the zone BZ patch are classified as candidate channel points (CCP);
d.2) for each zone BZ patch containing candidate channel points (CCP), these are projected towards at least two other of said EAM 3D polygonal meshes to check for intersections, and when they fall on a zone H patch or when they fall on a zone BZ patch which perimeter is at least in part in contact with a zone H patch they are classified as candidate exit points (CEP); and
d.3) candidate channel regions (CCR) are defined as those regarding a path running across EAM 3D polygonal meshes through links connecting two groups of candidate exit points (CEP), and containing one or more candidate channel points (CCP).

13. The method of claim 1, wherein said patches are volume patches and said candidate channel regions are candidate channel volumes, the method comprising performing said dilation of sub-step c.1) three-dimensionally on the zone S volume patches.

14. The method of claim 13, wherein said dilation is performed uniformly and perpendicularly to every point of the faces of each well-defined zone (S) volume patch:
for the faces of the external perimeter of the zone S volume patch, in order to consider, at sub-step c.2), as candidate channel points (CCP), corresponding to voxels of a candidate junction volume, the external perimeter points that intersect the external perimeter of adjacent zone S volume patches, and/or
for the faces of the internal perimeter of the zone S volume patch, in case the zone S volume patch has a hole (0) or cavity there within, in order to consider, at sub-step c.2), as candidate channel points (CCP), corresponding to voxels of a candidate hole volume, the internal perimeter points that intersect with other points of the same internal perimeter of the same zone S volume patch.

15. The method of claim 14, wherein:
said sub-step c.1) further comprises three-dimensionally eroding at least the already dilated perimeters of the zone S volume patches;
comparing the zone S volume patches before being dilated with themselves once dilated and erosioned at least once; and
if as a result of said comparison a difference is detected, said sub-step c.2) further comprises considering the points resulting from that difference and belonging to a zone BZ as candidate channel points (CCP) constituting:
for the faces of the internal perimeter of the zone S volume patch: a potentially candidate hole volume passing through said zone S volume patch, wherein said intersection of internal perimeter points is indirectly detected as a result of said detected difference; or
for the faces of the external perimeter of the zone S volume patch: a potentially candidate junction volume between at least two adjacent zone S volume patches.

16. The method of claim 15, comprising performing a plurality of said dilations followed by a plurality of said erosions, and then perform said comparison or a plurality of iterations including one dilation followed by one erosion, and perform said comparison after each of said iterations.

17. The method of claim 13, wherein the method comprises:
   determining that said potentially candidate hole volume or said potentially candidate junction volume corresponds to a candidate channel volume (CH) if at least two ends thereof contact zone H or zone BZ volume patches; and
   applying a morphological skeletonization algorithm to said candidate channel volume (CH) to find the centre line of the channel.

18. The method of claim 1, wherein said channels are volumetric data representing electrically conductive channels of the myocardium of a heart, in which case said zone S represents an electrically non-conductive zone, said zone BZ represents a slow conducting zone and said zone H represents an electrically conductive zone.

19. A non-transitory computer-readable medium comprising computer-readable instructions recorded thereon for identifying channels in a 3D data volume, said channels being passage-like structures of a 3D object within said 3D data volume, comprising:

a) obtaining a 3D volume of the object containing, directly or on a sub-volume isolated therefrom, at least two different data sub-volumes identified based on physical parameter values representative of physical properties of said object, and termed as: zone S and zone BZ;
b) generating zone S and zone BZ patches from, respectively, said at least two sub-volumes; and
c) automatically identifying possible channels, in said zone BZ patches, by means of automatically obtaining candidate channels regions, as follows:
   c.1) dilating at least the perimeters of the zone S patches;
   c.2) considering as candidate channel points (CCP) the perimeter points that intersect the perimeter of adjacent zone S patches, and/or the perimeter points that intersect with the same perimeter of the same zone S patch, before reaching a maximum dilation and lie within a zone BZ patch, and
   c.3) determining that adjacent candidate channel points (CCP) form a candidate channel region (CCR).

* * * * *